US010773912B2

(12) United States Patent
Beskitt et al.

(10) Patent No.: US 10,773,912 B2
(45) Date of Patent: Sep. 15, 2020

(54) CENTER DE-SKEW SUBASSEMBLY TO CENTER ALIGN DOCUMENTS

(71) Applicant: Diebold Nixdorf, Incorporated, North Canton, OH (US)

(72) Inventors: William Daniel Beskitt, Canton, OH (US); Jasen James Smolk, Ravenna, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 15/750,723

(22) PCT Filed: Jul. 12, 2017

(86) PCT No.: PCT/US2017/041680
§ 371 (c)(1),
(2) Date: Feb. 6, 2018

(87) PCT Pub. No.: WO2018/013665
PCT Pub. Date: Jan. 18, 2018

(65) Prior Publication Data
US 2020/0082657 A1 Mar. 12, 2020

Related U.S. Application Data

(60) Provisional application No. 62/361,670, filed on Jul. 13, 2016.

(51) Int. Cl.
*B65H 7/10* (2006.01)
*G07D 11/17* (2019.01)
(Continued)

(52) U.S. Cl.
CPC .............. *B65H 7/10* (2013.01); *B65H 9/002* (2013.01); *B65H 9/101* (2013.01); *B65H 9/106* (2013.01);
(Continued)

(58) Field of Classification Search
CPC ........ G07D 11/17; B65H 9/101; B65H 9/002; B65H 7/10
See application file for complete search history.

(56) References Cited

U.S. PATENT DOCUMENTS 4,657,239 A * 4/1987 Ikesue .................... B65H 9/101
271/227
6,019,365 A * 2/2000 Matsumura .............. B65H 7/10
271/227

(Continued)

FOREIGN PATENT DOCUMENTS

EP 2793198 A1 10/2014

OTHER PUBLICATIONS

International Search report issued in corresponding PCT application; 4 pages.

*Primary Examiner* — Jeremy R Severson
(74) *Attorney, Agent, or Firm* — Black, McCuskey, Souers & Arbaugh LPA

(57) ABSTRACT

A center-alignment apparatus for use in an ATM has a transport mechanism to transport a document into the ATM. One or more plates operable in tandem to move the document toward a centerline of a path the document is to travel. Edge-detection sensor(s) on the plate sense an edge of the document when the plate(s) is moved toward the centerline. A translate/rotate mechanism translates and rotates the document while the translate/rotate mechanism transversely moves the document toward the center until another edge-detection sensor detects an edge of the document to create a parallel-aligned document. The control logic controls the plate(s) to centers the parallel-aligned document about the centerline to create a centered document.

19 Claims, 26 Drawing Sheets

(51) Int. Cl.
  *B65H 9/10* (2006.01)
  *G06K 9/18* (2006.01)
  *G07F 19/00* (2006.01)
  *B65H 9/00* (2006.01)

(52) U.S. Cl.
  CPC ............ *G06K 9/186* (2013.01); *G07D 11/17*
    (2019.01); *G07F 19/20* (2013.01); *B65H*
    *2404/732* (2013.01); *B65H 2701/1912*
    (2013.01); *G07D 2211/00* (2013.01)

(56) References Cited

U.S. PATENT DOCUMENTS

| | | | | |
|---|---|---|---|---|
| 7,469,894 | B2* | 12/2008 | Seto | B65H 9/04 |
| | | | | 271/238 |
| 8,882,106 | B2* | 11/2014 | Maenishi | B26D 7/015 |
| | | | | 271/249 |
| 2005/0045449 | A1* | 3/2005 | Nago | B65H 9/101 |
| | | | | 194/207 |
| 2005/0077215 | A1 | 4/2005 | Tokimi et al. | |
| 2010/0289211 | A1* | 11/2010 | Nireki | B65H 5/062 |
| | | | | 271/226 |
| 2014/0083815 | A1* | 3/2014 | Chang | G07D 11/17 |
| | | | | 194/344 |

* cited by examiner

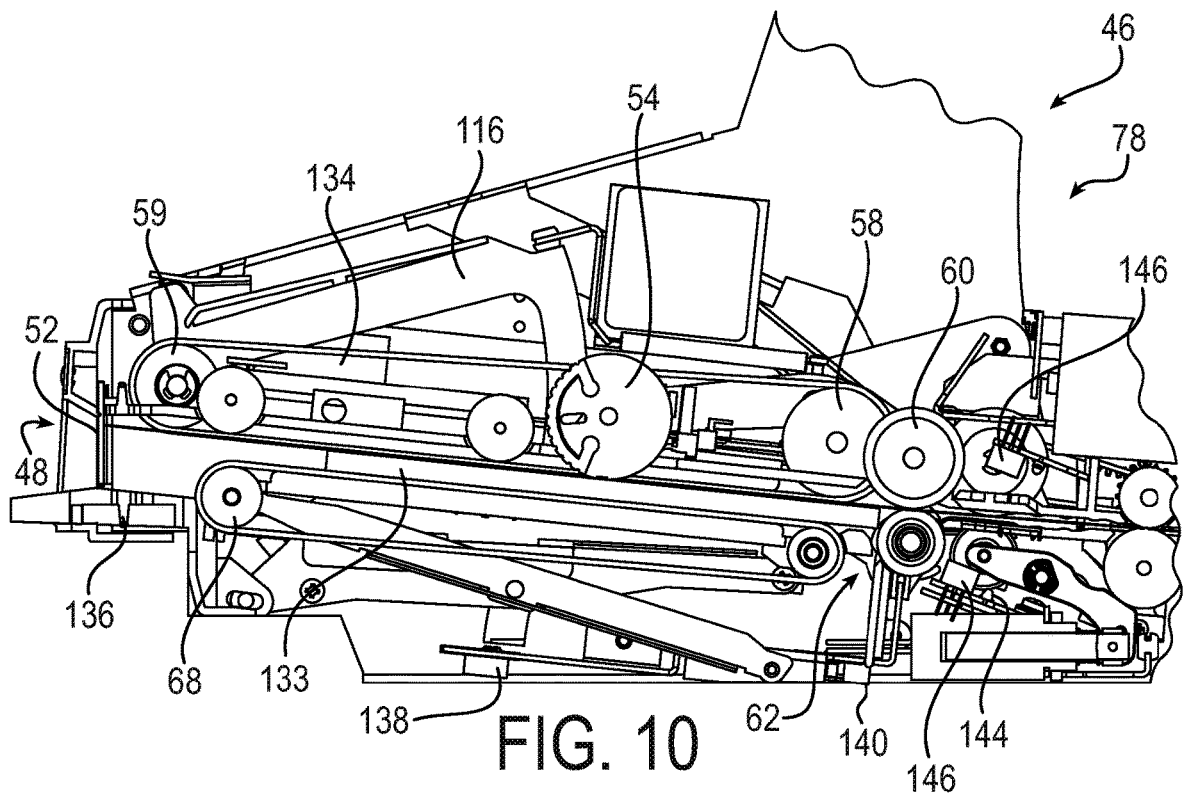
FIG. 10
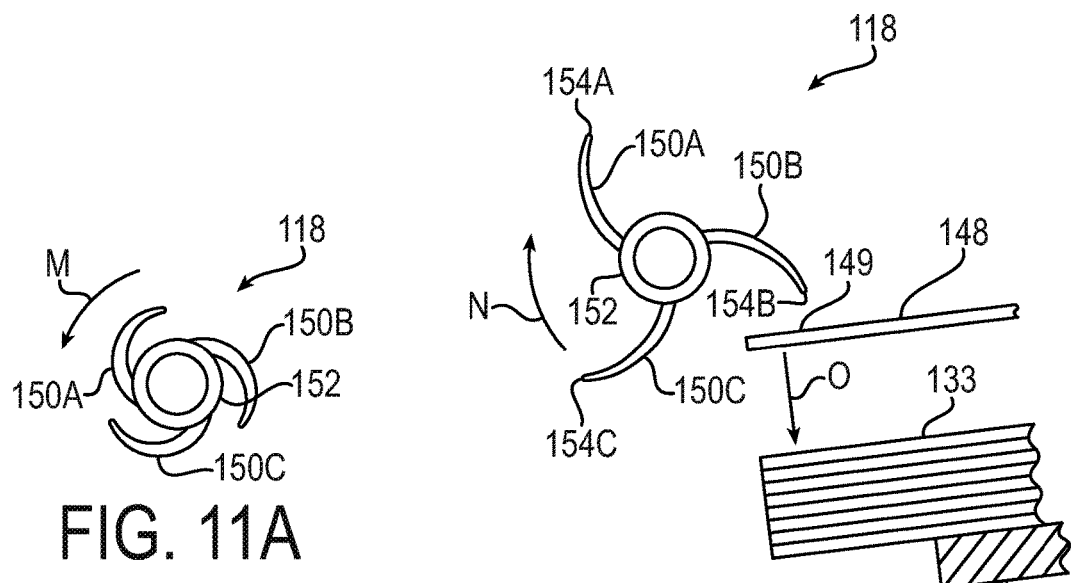
FIG. 11A
FIG. 11B

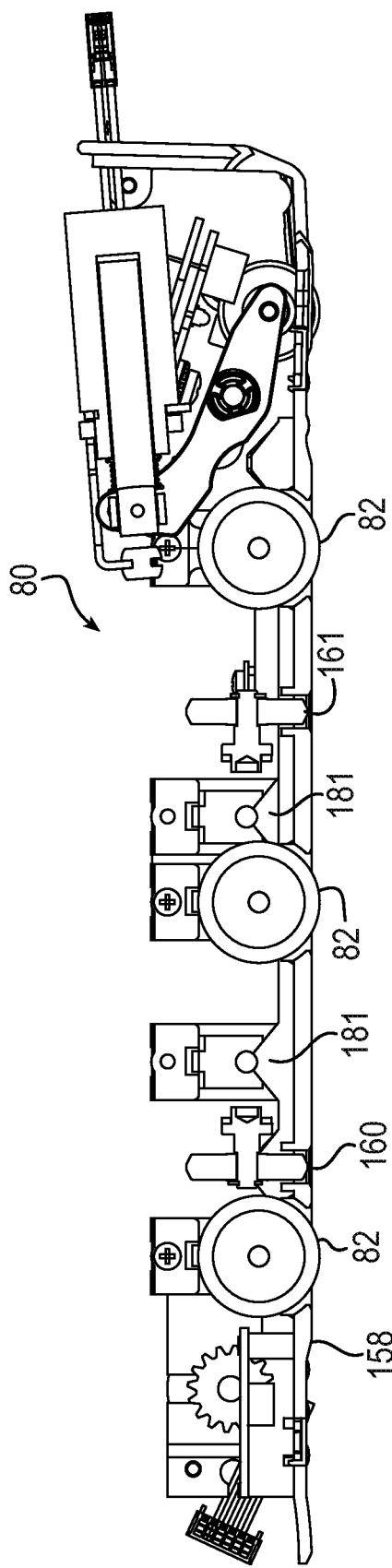
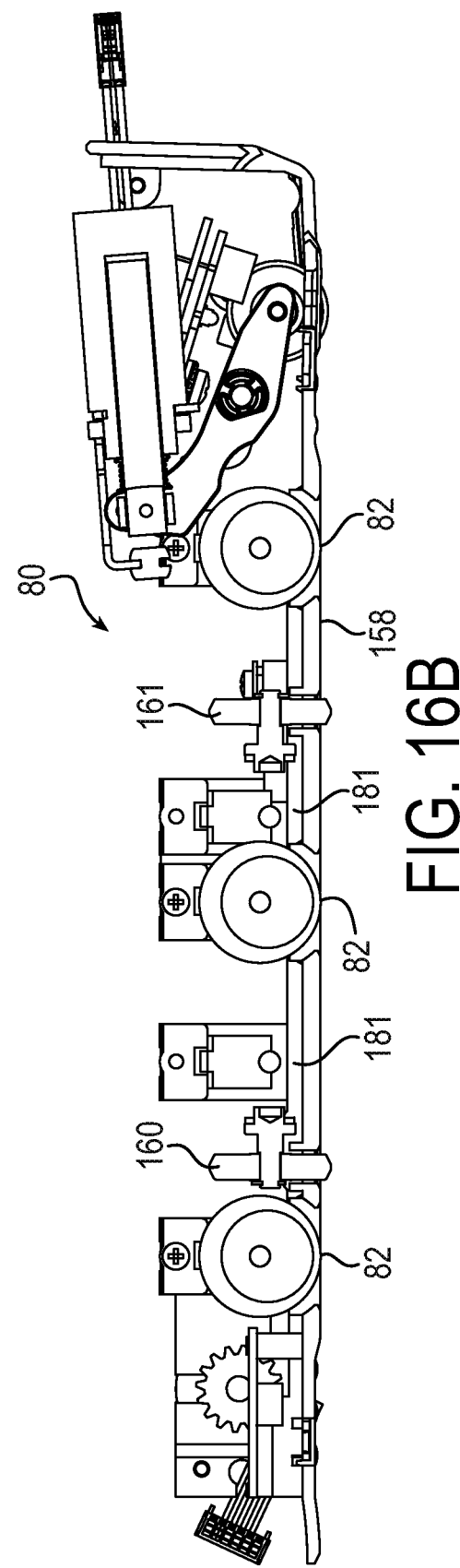
FIG. 16A
FIG. 16B

CENTER DE-SKEW SUBASSEMBLY TO CENTER ALIGN DOCUMENTS

CROSS-REFERENCE TO RELATED APPLICATIONS

This application is the U.S. National Stage of International Patent Application No. PCT/US17/41680, filed Jul. 12, 2017, which claims priority to and the benefit of U.S. Provisional Patent Application No. 62/361,670, filed 13 Jul. 2017, the contents of which are hereby incorporated by reference in their entirety.

FIELD OF THE INVENTION

Various configurations of the current invention relate generally to apparatus, systems, and methods for banking. More particularly, the apparatus, systems, and methods relate to banking machines. Specifically, the apparatus, systems, and methods provide for banking machines that accept deposits and other documents.

BACKGROUND ART

Banking machines are known in the prior art. Automated banking machines are commonly used to carry out transactions such as dispensing cash, checking account balances, paying bills and/or receiving deposits from users. Other types of banking machines may be used to purchase tickets, to issue coupons, to present checks, to print scrip and/or to carry out other functions either for a consumer or a service provider.

Automated banking machines often have the capability of accepting deposits from users. Such deposits may include items such as envelopes containing checks, credit slips, currency, coin or other items of value. Mechanisms have been developed for receiving such items from the user and transporting them into a secure compartment within the banking machine. Periodically a service provider may access the interior of the machine and remove the deposited items. The content and/or value of the deposited items may be verified so that a credit may be properly applied to an account of the user or other entity on whose behalf the deposit has been made. Such depositories often include printing devices which are capable of printing identifying information on the deposited item. This identifying information enables the source of the item to be tracked and credit for the item correlated with the proper account after the item is removed from the machine. What is needed is a better banking machine.

SUMMARY OF THE INVENTION

One embodiment is a center de-skew (CDS) subassembly to align a document about a center of a path to be traveled by the document. The CDS subassembly includes a lower-central plate, a transport mechanism, a pair of generally planer planar plates, a plurality of edge-detection sensors and a control logic. The lower-central plate has a planar surface with a centerline. The transport mechanism transports the document so that the document is adjacent the lower-central plate. The generally planar plates move in tandem toward and away from the centerline. Several edge-detection sensors on the pair of generally plainer plates sense an edge of the document as the pair of planar plates move toward the centerline. The translate/rotate mechanism translates and rotates the document until another one of the edge-detection sensors detects an edge of the document. While rotating the document the control logic further controls the plates to move in tandem toward from the centerline moving the document until at least one of the edge-detection sensors detects an edge of the document, wherein the control logic is configured to operate the translate/rotate mechanism to rotate the document. Simultaneously, the plates are moved in tandem toward the centerline to a move sensors for detecting edges of the document and feeding edge detection by the sensors back to the translate/rotate mechanism so that the translate/rotate mechanism may align the document parallel to the centerline as a parallel-aligned document. The control logic then controls the translate/rotate mechanism to center the parallel-aligned document about the centerline to create a centered document.

Another embodiment is a center-alignment apparatus for use in an ATM has a transport mechanism to transport a document into the ATM. One or more plates operable in tandem to move the document toward a centerline of a path the document is to travel. Edge-detection sensor(s) on the plate sense an edge of the document when the plate(s) is moved toward the centerline. A translate/rotate mechanism translates and rotates the document while the plate(s) transversely moves toward the center until another edge-detection sensor detects an edge of the document to create a parallel-aligned document. The control logic controls the translate/rotate mechanism to center the parallel-aligned document about the centerline to create a centered document.

Another embodiment is a method of centering a document in an ATM. The method begins by receiving a document at a customer interface from a customer. The document is then transported into a center and de-skew (CDS) subassembly The CDS subassembly has a centerline of a path the document is to travel. Two planar plates on each side of the centerline are moved in tandem toward each other without moving the document. As the document is moved, sensing an edge of the document with sensors on sides of the two planar plates. After sensing the edge, rotating the document to align the document parallel the centerline. The document is then transversely moved so that the document is centered about the centerline.

BRIEF DESCRIPTION OF THE DRAWINGS

One or more example preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

FIG. 10 illustrates an example embodiment of a transport subassembly with a thumper wheel in a home position.

FIGS. 11A-B illustrate an example embodiment of paddles.

FIGS. 16A-B illustrate example side views of the embodiment of the lower center de-skew subassembly.

Similar numbers refer to similar parts throughout the drawings.

DETAILED DESCRIPTION OF THE DRAWINGS

Figure 1:
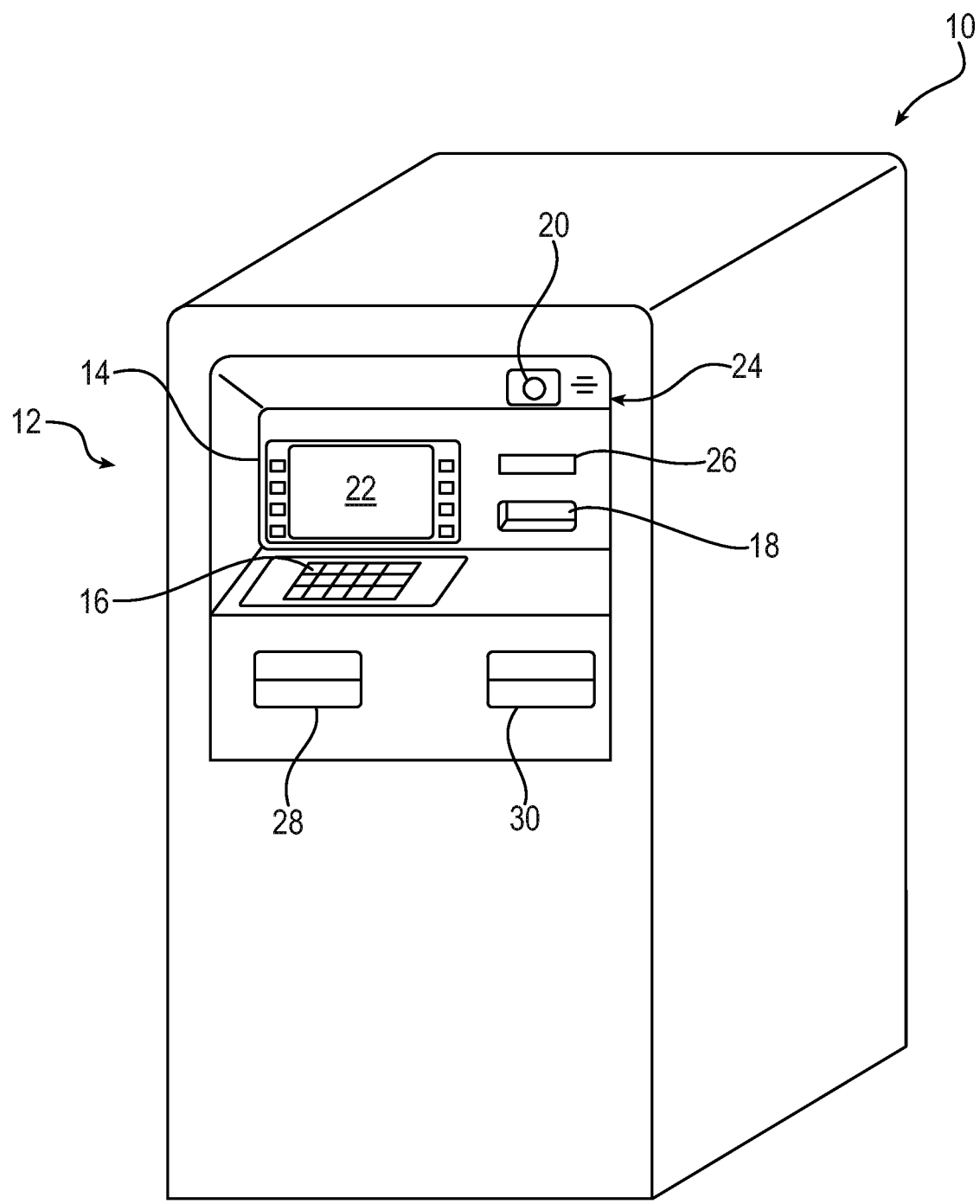
FIG. 1 illustrates one example perspective view of an ATM.

FIG. 1 illustrates an example embodiment of an automated transaction machine (ATM) 10 which includes an exemplary deposit accepting apparatus and which performs an exemplary method of operation. For purposes of this description, any device which is used for carrying out transactions involving transfers of value shall be referred to as an automated transaction machine. The ATM 10 includes a user interface 12 that includes input and output devices. In the exemplary embodiment, the input devices include a plurality of function buttons 14 through which a user may provide inputs to the machine. The exemplary input devices further include a keypad 16 through which a user may provide numeric or other inputs. A further input device in this exemplary embodiment includes a card reader 18. The card reader 18 may be of the type used for reading magnetic stripe cards, smart cards or other articles presented by a user. Another input device on the exemplary ATM 10 includes an image capture device 20. The image capture device may be a camera or other device for capturing the image of a user or the surroundings of the machine. The exemplary embodiment may include biometric reading devices. Such devices may include an imaging or reading device such as a fingerprint reader, iris scan device, retina scan device or other biometric input and the like. It should be understood that the camera mentioned may serve as a biometric reading device in some embodiments.

The user interface 12 also includes output devices. In the exemplary embodiment, the output devices include a display 22. The display 22 includes a visual output device such as a cathode ray tube (CRT), liquid crystal display (LCD) or another type of display for providing messages and prompts to a user. These messages and prompts may be responded to by inputs from the user through the function buttons 14 adjacent to the display or by inputs through the keypad 16 or through other inputs. A further output device in the exemplary embodiment includes an audio output device schematically indicated 24. The audio output device may be used to provide audible outputs to the user. A further output device in the exemplary embodiment includes a printer. The printer may be used to provide outputs in the form of receipts or other items or information to the user. The printer is in connection with a printer outlet 26 in the user interface.

It should be understood that the input and output devices shown are exemplary and in other embodiments of the invention other types of input and output devices may be used. Such input and output devices commonly receive information which is usable to identify the customer or their account. Such devices are also operative to provide information to a user and to receive instructions from a user concerning transactions which are to be carried out through use of the ATM 10. Various forms of user interfaces and input and output devices may be used in connection with various embodiments.

In one exemplary embodiment, ATM 10 includes a cash dispensing mechanism. The cash dispensing mechanism is selectively operated to enable the dispensing of cash to authorized users of the machine. Cash is provided to the users through a cash outlet 28. Another exemplary embodiment has the ability to accept deposits through the ATM. The machine includes a deposit accepting opening 30. In the exemplary embodiment the ATM is enabled to accept deposits in the form of sheets, envelopes and other documents.

Figure 2:
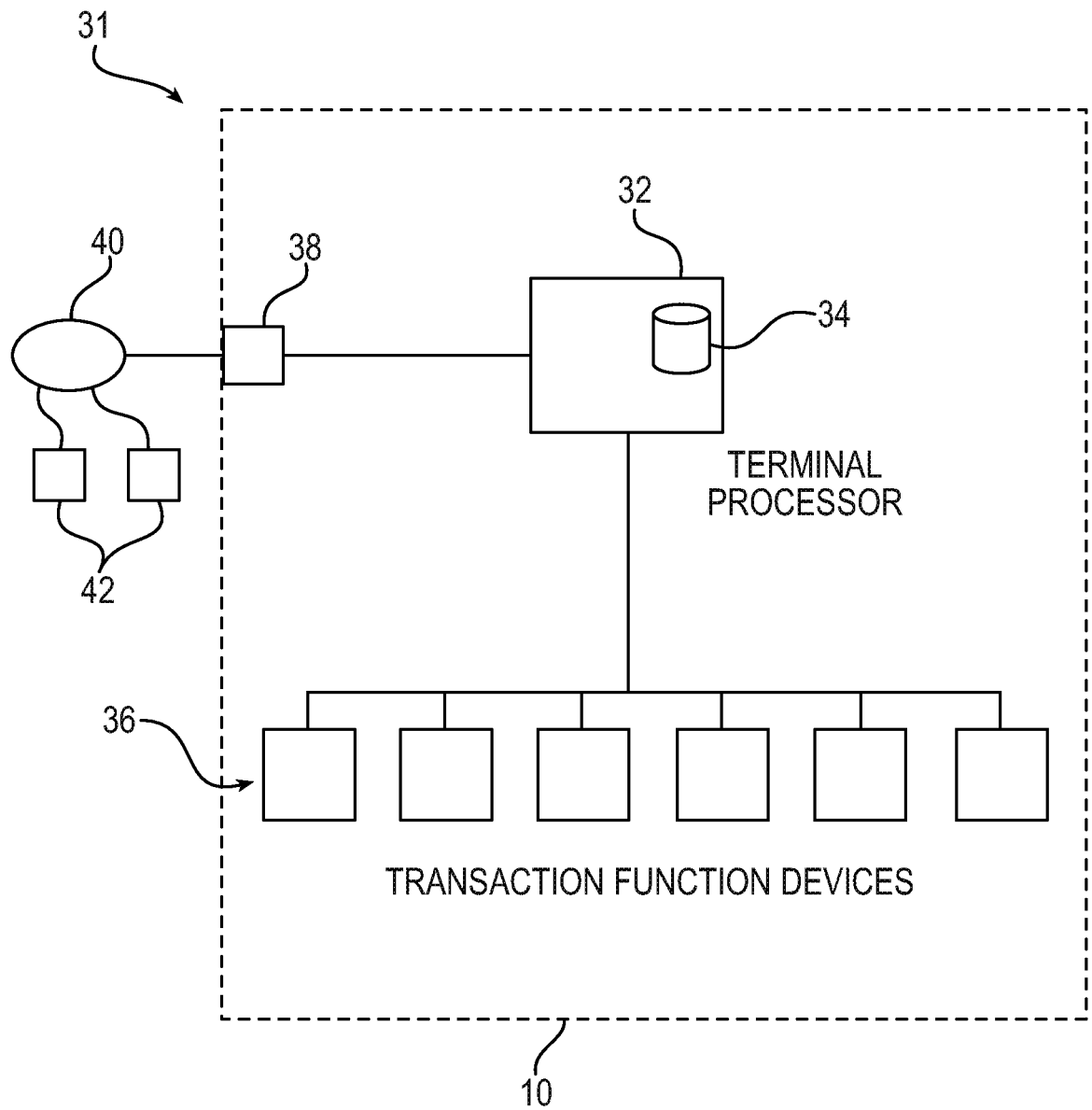
FIG. 2 illustrates one example of a schematic view of the ATM of FIG. 1.

FIG. 2 illustrates an example schematic view of the computer architecture associated with the ATM 10 and an exemplary system 31 in which it is used. The ATM 10 includes one or more computers, processors and other logics. The one or more computers, processors and other logics in the exemplary embodiment is schematically represented by a terminal processor 32. "Processor" and "Logic", as used herein, includes but is not limited to hardware, firmware, software and/or combinations of each to perform a function(s) or an action(s), and/or to cause a function or action from another logic, method, and/or system. For example, based on a desired application or needs, logic and/or processor may include a software-controlled microprocessor, discrete logic, an application specific integrated circuit (ASIC), a programmed logic device, a memory device containing instructions or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

The terminal processor 32 is in operative connection with one or more data stores schematically represented 34. The terminal processor 32 operates to control transaction function devices 36 which are included in the ATM. These transaction function devices 36 include devices which operate in the ATM to carry out transactions. Transaction function devices 36 may include, for example, currency dispensing mechanisms, currency presenters, currency acceptors, currency validators, item dispensing devices, card readers, printers, depositories, other input and output devices and other devices. Transaction function devices 36 may further include cameras, sensors, image capture devices and other items such as the transport subassembly, a de-skew subassembly and an escrow punter subassembly that are described below. The particular character of the transaction function devices depends on the particular capabilities for carrying out transactions to be provided by the ATM.

In the exemplary embodiment, ATM 10 exchanges messages through a communication interface 38 with a communications network 40. The network 40 may be one or more types of data communications network, including an electronic funds network (EFT), a phone line, a data line, a lease line, a wireless network, a telecommunications network or other medium for communicating messages to and from the ATM 10. The communications interface 38 provided is suitable to work in connection with the particular type of network(s) to which the ATM 10 is connected. In the exemplary embodiment the ATM is connected to a network which communicates with a plurality of ATMs such as, for example, Cirrus®, Plus®, MAC® or other debit card network. Of course, in other embodiments other suitable networks for processing credit, debit or other types of online transactions may be used including the Internet.

As schematically represented in example FIG. 2, a system 31 including the network 40 is in operative connection with one or more host computers 42. Host computers 42, in the exemplary embodiment, are operative to authorize transaction requests which are made by users at the ATM 10. The ATM is operative to deliver to the host computer data identifying the user and/or their account and the particular transactions that they wish to conduct. The request is routed through the network to a host computer that can evaluate and/or authorize the request. The appropriate host computer receives and analyzes this data and returns to the ATM 10 a message which indicates whether the transaction requested is authorized to be conducted at the machine. In response to receiving a message indicating that the transaction should proceed, the ATM 10 operates the transaction function devices to carry out the requested transaction. If the transaction is not authorized, the user is so informed through the display and the transaction is prevented. The ATM 10 is also operative, in the exemplary embodiment, to send to the host computer authorizing the transaction, a completion message which includes data indicative of whether the transaction was able to be carried out successfully. Upon receiving the information that the transaction was carried out, the host computer 42 is operative to take appropriate action such as to credit or debit a user's account. It should be understood that this system shown in FIG. 2 is exemplary and in other embodiments other approaches to operating ATMs and authorizing transactions may be used.

In one example embodiment, the transaction function devices 36 include a deposit accepting apparatus 44 as discussed in further detail below with reference to FIGS. 3-26. The deposit accepting apparatus 44 is capable of accepting deposited items such as envelopes as well as sheets and documents such as checks. This deposit accepting apparatus in alternative embodiments may be capable of accepting and analyzing other items such as papers, instruments, billing statements, invoices, vouchers, wagering slips, receipts, scrip, payment documents, driver's licenses, cards and items which may be moved in the deposit accepting device. Various functionality the deposit accepting apparatus 44 may be controlled by the terminal processor 32, other processors, and/or other logic.

Figure 3:
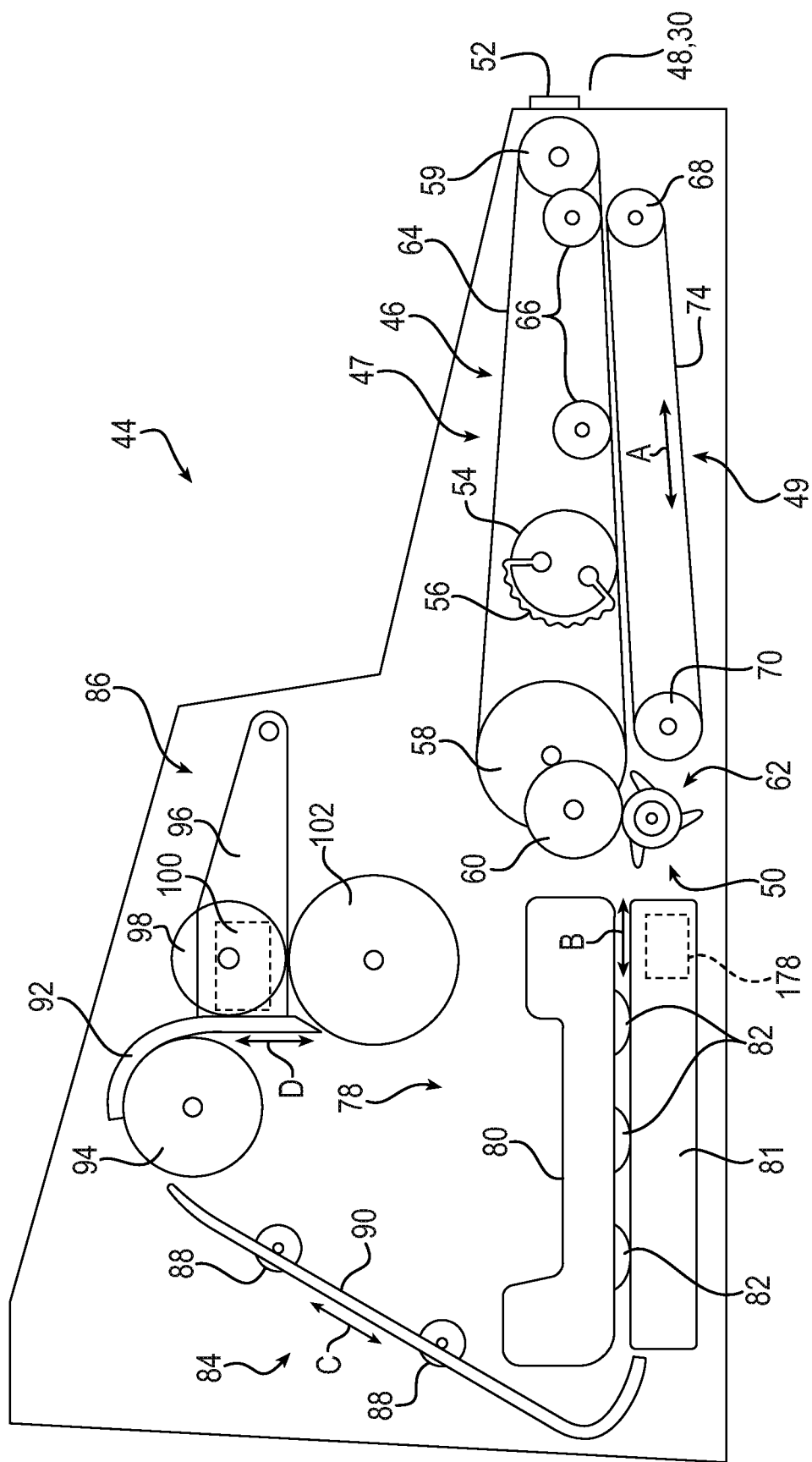
FIG. 3 illustrates an example embodiment of a deposit accepting apparatus.

As illustrated in example FIG. 3, deposit accepting apparatus 44 includes a transport subassembly 46. Transport subassembly 46 extends in generally a straight path from an inlet 48 to an outlet 50. The inlet 48 is positioned adjacent to a deposit accepting opening 30 through the body of the ATM 10. Access to the transport subassembly 46 from the outside of the ATM may be controlled by a gate 52 or other suitable blocking mechanism which operates under the control of the terminal processor 32. The terminal processor 32 operates to open the gate 52 only when an authorized user of the ATM 10 is to provide items to or to receive items from the transport subassembly 46 of the deposit accepting apparatus 44.

The transport subassembly 46 includes a plurality of belts or other moving members. Moving members operate to engage items deposited into the transport subassembly 46 and to move deposited items in engagement therewith into the transport subassembly 46 in the left direction of arrow A. Double headed arrow A indicates the documents may be accepted by the ATM and unacceptable documents returned from the ATM to a customer of the ATM. In this example embodiment, the belts and moving members include, for example, and upper-belt assembly 47 and a lower-belt assembly 49. The upper-belt assembly 47 includes a rear upper pulley 58 and front upper pulley 59 with one or more upper belts 64 wrapped around each of these pulleys as illustrated. Intermediate upper pulleys 66 contact lower portions of the upper belt(s) 64. The upper-belt assembly 47 also includes a thumper wheel 54 with a rubber portion 56 that spans at least a portion of its outside diameter of thumper wheel 54, as illustrated. The lower-belt assembly 49 includes a front-lower belt-drive pulley 68 and rear lower belt pulley 70 with one or more lower belts 74 wrapped around these two pulleys 68, 70. The transport subassembly 46 also includes a stripper assembly 62 as well as an upper feed wheel 60 located near the outlet 50 and generally between the upper-belt assembly 47 and the lower-belt assembly 49. The stripper assembly components and their functionality will be discussed in much more detail later. However, in general the stripper assembly 62 works both in a forward and reverse direction allowing the transport subassembly 46 to transport documents in a forward direction from the inlet 48 to the outlet 50. If the deposit accepting apparatus 44 accepts defective or other unsuitable documents the same stripper assembly 62 also allows for these documents to be returned from the outlet 50 to the inlet 48 back to a customer using the ATM 10.

After documents are received at the transport subassembly 46 they are then individually passed in the left direction of arrow B to a center and de-skew (CDS) subassembly 78. The CDS subassembly 78 is briefly introduced in FIG. 3 before being discussed in much more detail below and with reference to FIGS. 15-17. In general, individual documents (e.g., checks) enter the CDS subassembly 78 are center aligned along a path the documents are traveling. The CDS subassembly 78 includes an upper CDS subassembly 80 and a lower CDS subassembly 81 that each house and provide support for various components of the CDS subassembly 78. CDS transport rollers 82 are used to transport documents from the transport subassembly 46 into the CDS subassembly 78. As discussed below, after a document has been aligned to the center of its travel path, the CDS subassembly 78 transports it using rollers 82 out of the CDS subassembly 78 and onto a main transport 84. While exiting the CDS subassembly 78, the document may have its magnetic ink character recognition (MICR) indicia read by sensors within the subassembly 78. In other embodiments, other image(s) may be captured while the document is in the main transport 84 and in other embodiments, image(s) may be captured when the document is in the escrow subassembly 85 described below.

After leaving the CDS subassembly 78, the documents travel on a main transport 84 in the general direction of the upper end of arrow C toward an escrow/printer subassembly 86. As understood by those of ordinary skill in the art, the main transport 84 may contain pulleys, belts, rollers 88, transport tracks 90 and the like for moving documents to the escrow/printer subassembly 86. An upper transport 92 in combination with an upper transport wheel 94 redirects documents downward in a vertical direction of the bottom of arrow D and to the escrow/printer subassembly 86.

One of the primary components of an example embodiment of an escrow/printer subassembly 86 include a generally horizontal support arm 96. A pivotal printer support 98 is pivotally attached to the support arm 96. The pivotal printer support 98 (e.g., printer housing) houses a printer 100 that pivots with the pivotal printer support 98. The printer 100 may be an ink jet printer or any other desirable printer as understood by those with ordinary skill in the art. The escrow/printer subassembly 86 further includes a document spool 102. This configuration and arrangement allows, as discussed further below, for the printer 100 to print on one or both sides of a document by rotating between vertical and horizontal orientations.

Figure 4:
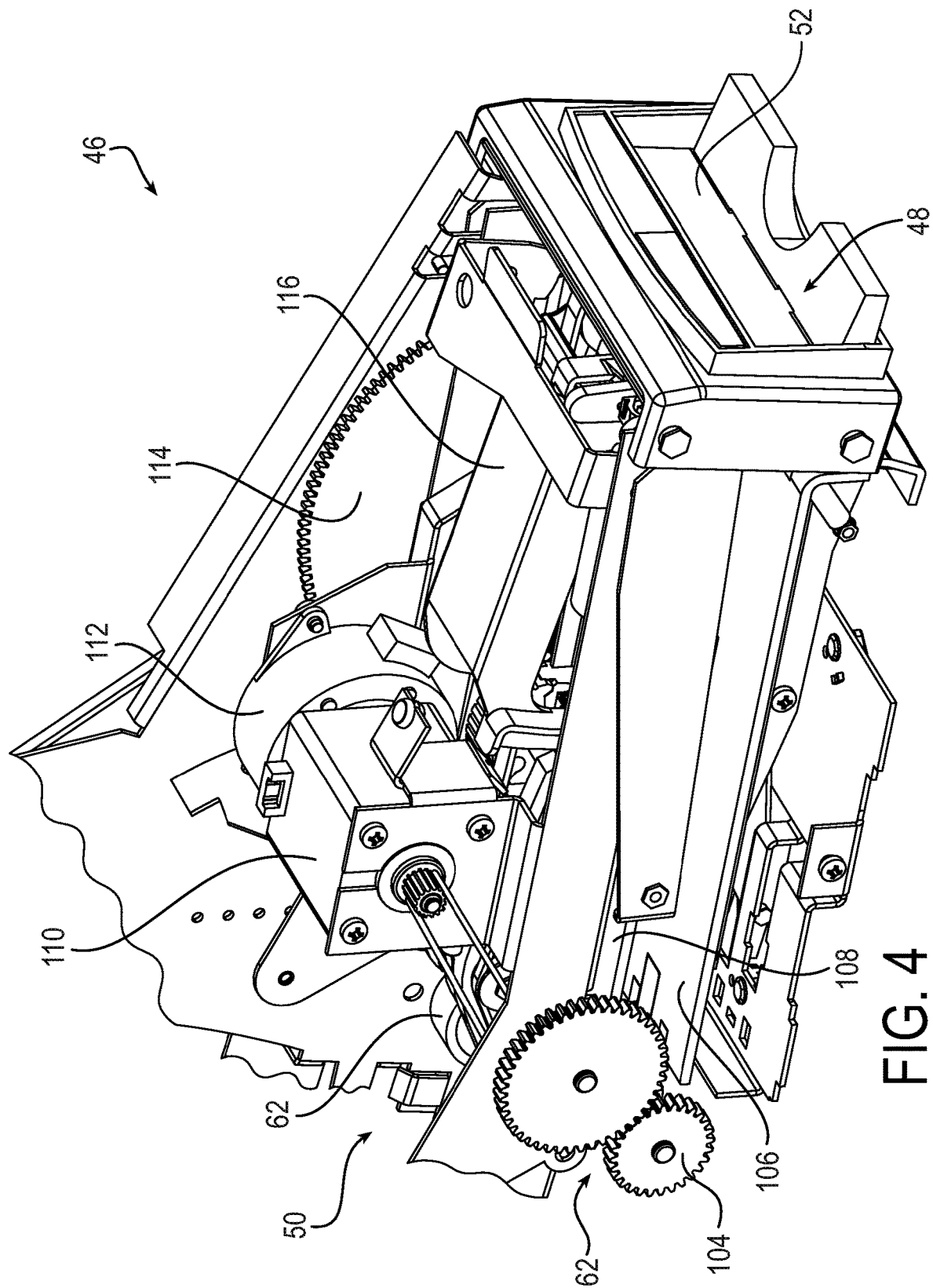
FIG. 4 illustrates an example embodiment of a transport subassembly.
Figure 5:
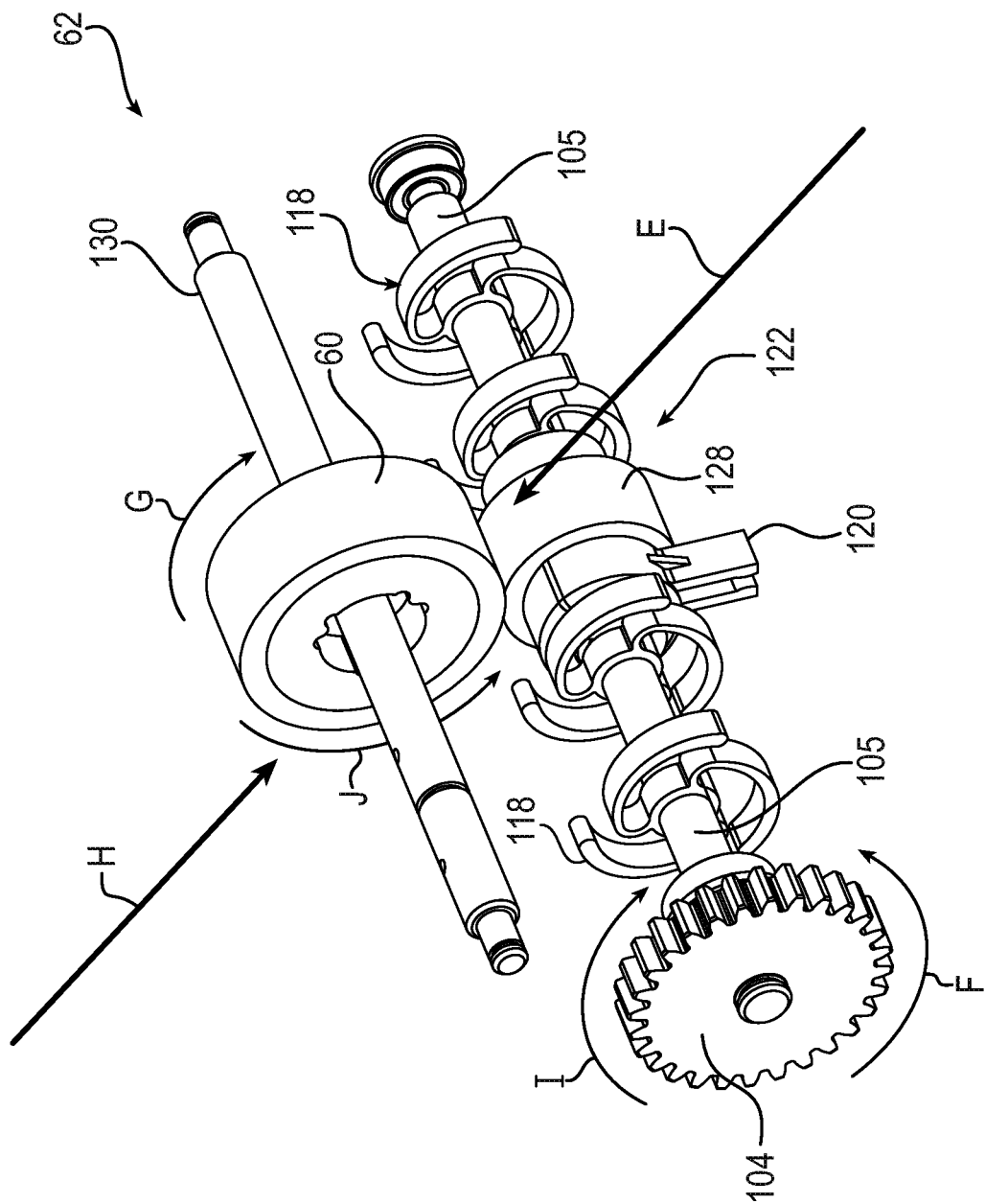
FIG. 5 illustrates an example assembled view of an embodiment of a stripper assembly.

FIG. 4 illustrates the example embodiment of the transport subassembly 46 in more detail including its inlet 48, outlet 50 and gate 52. This figure further together with FIG. 5 illustrates a stripper gear 104 attached to a stripping shaft 105 (e.g., stripping axel) of its stripper assembly 62 as well as a lower platen 106 supporting the lower belt(s) 74 and an upper platen 108 supporting components driving the upper belt(s) 64 as well as other components. As appreciated by those of ordinary skill in the art, other example components illustrated in FIG. 4 include a feed/thumper motor 110, an upper belt/paddle motor 112, a cam 114, and a note stop element 116.

Figure 6:
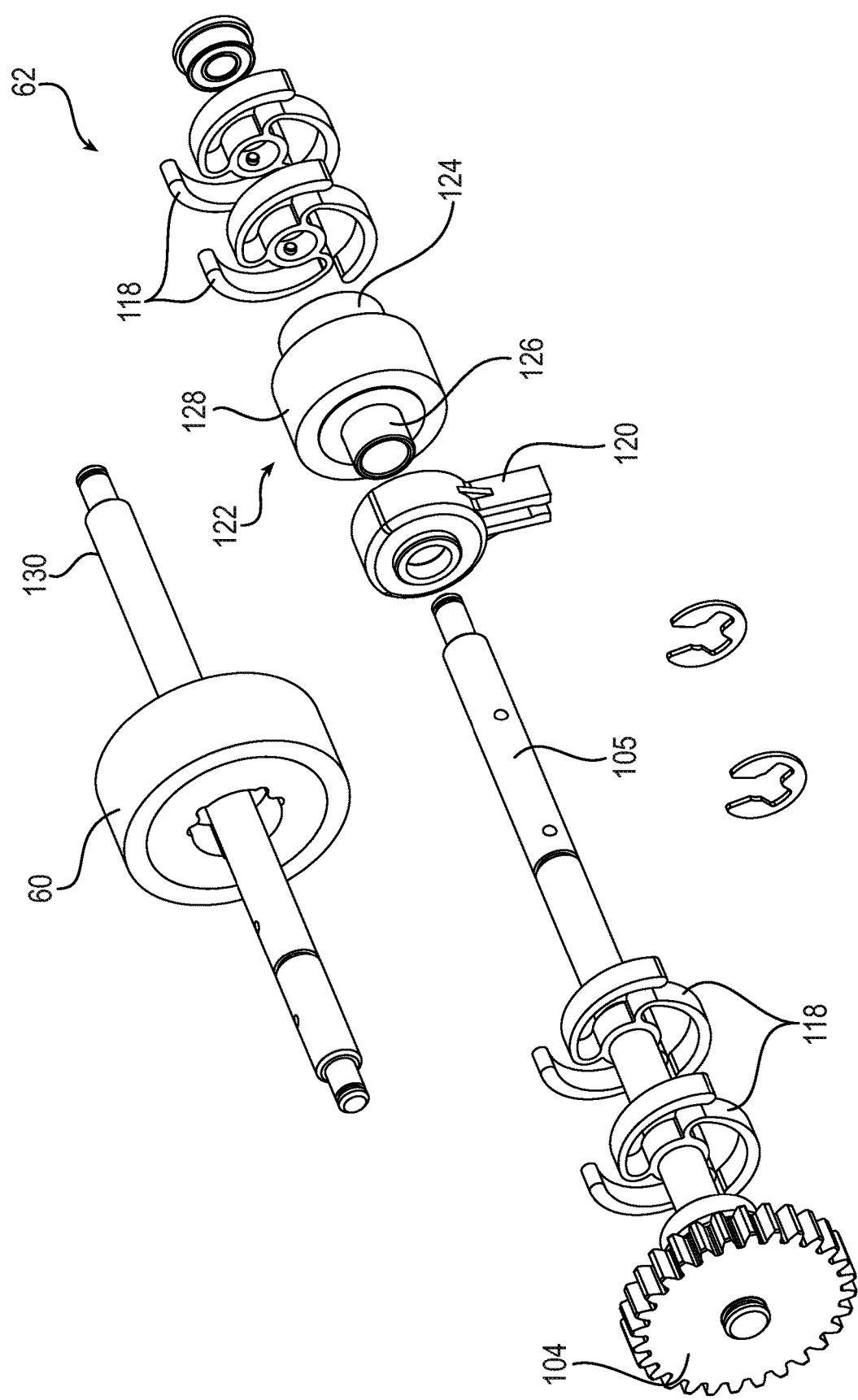
FIG. 6 illustrates an example exploded view of the embodiment of the stripper assembly of FIG. 5.
Figure 7A:
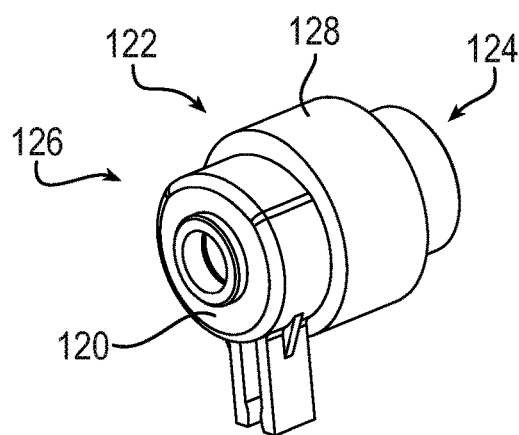
FIG. 7 illustrates example views of a clutch assembly.
Figure 7B:
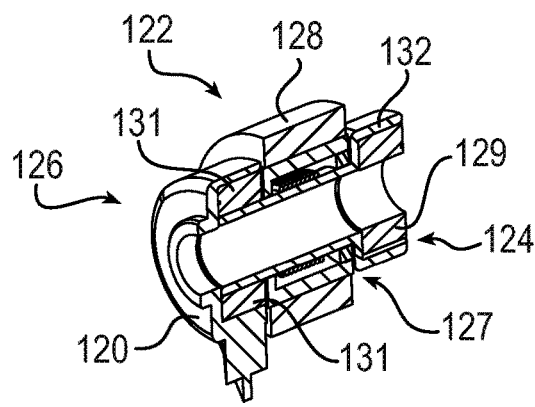
Figure 7C:
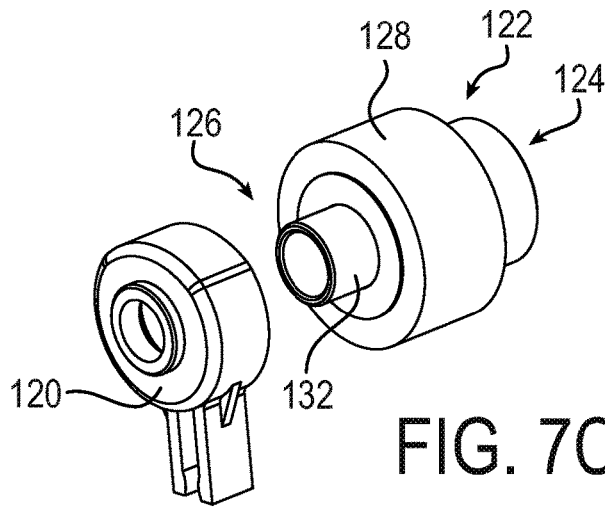
Figure 7D:
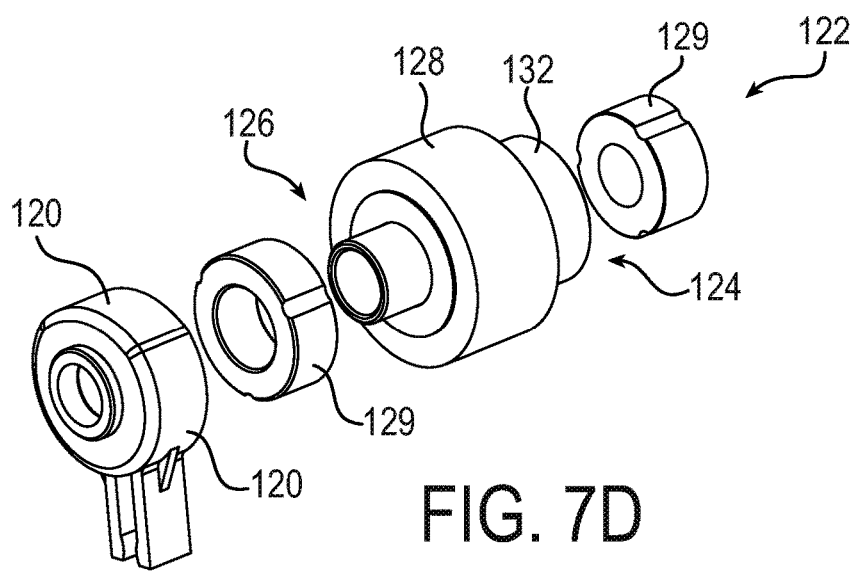
Figure 8:
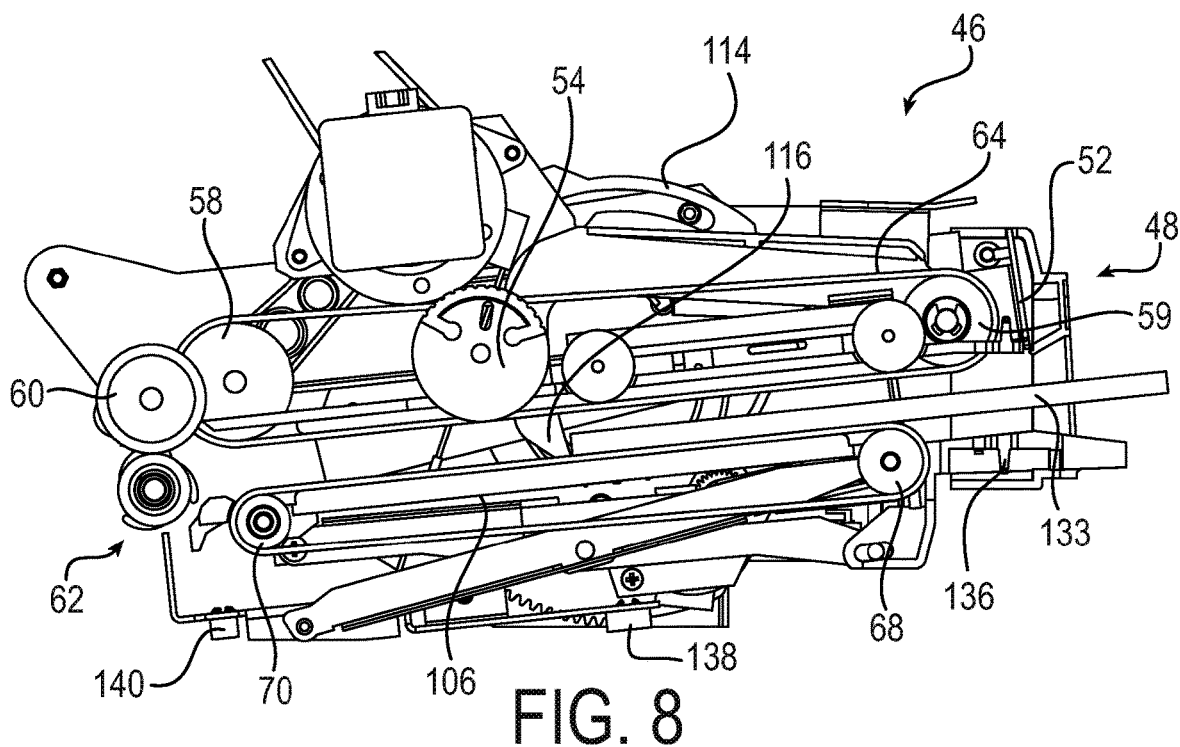
FIG. 8 illustrates the example embodiment of the transport subassembly in a position to receive documents.

FIGS. 5 and 6, respectively, illustrate assembled and exploded views of an embodiment of the stripper assembly 62 including the stripper gear 104, the stripping shaft 105 and the feed wheel 60 introduced earlier. Paddles 118 are attached to the stripping shaft 105 at various locations as illustrated. The stripping shaft 105 passed through a ground link 120 and is supported by the ground link 120, as illustrated. A clutch assembly 122 is attached to the stripping shaft 105 near the ground link 120. As understood by those of ordinary skill in the art, the stripping shaft may be supported or located by ball bearings and/or the feed wheel 60. One of the bearings may be spring loaded and in a slot so that as the stripper and or feed wheel 60 wear it can move to maintain contact with the feed wheel 60. The ground link 120 provides anti-rotation for the clutch assembly while allowing some translation in the wear direction. The clutch assembly 122 includes a ground link with a one-way clutch, an inner-hub 124 with a one-way clutch 129, a clutch outer-hub 126 with a drag clutch 127, and a stripping tire 128. In operation, the stripping tire 128 rides on the upper feed wheel 60 before engaging with a document that will be sandwiched between the stripping tire 128 and the feed wheel 60. The upper feed wheel 60 is mounted to a feed wheel shaft 130 and may be driven with a gear when accepting documents. In some embodiments, the upper feed wheel 60 and its shaft may be raised or lowered onto the stripping tire 128.

As best seen in FIGS. 7A-D the clutch assembly 122 further includes a clutch linking assembly 132. The exemplary clutch linking assembly 132 generally has two cylindrical sections of differing diameters. The smaller diameter cylindrical section is longer than the cylindrical section with a larger diameter. As illustrated, the clutch inner-hub 124 is mounted in the cylindrical section of the clutch linking assembly 132 having a larger diameter section. The cylindrical section of the clutch linking assembly 132 having a smaller diameter passes through the stripping tire 128 and into an opening of the ground link 120.

In operation, the stripper assembly 62 with its clutch assembly 122 is used for a forward paper feeding mechanism that forwards a single document in the direction of arrow E (FIG. 5) and prevents multiple sheets from feeding into the CDS subassembly 78. To reduce the number of parts in the deposit accepting apparatus 44, the feeding area is also used to stack returning sheets in a reverse stacking direction of arrow H (FIG. 5) using the same stripper assembly 62. When feeding (accepting documents), the clutch inner-hub 124 will be held by its one-way clutch 129 to prevent the clutch inner-hub 124 from rotating in the feed direction (arrow F) through the ground link 120. In this example embodiment, the stripping tire 128 is bonded to the clutch outer-hub 126 so that the stripping tire 128 is driven by the upper feed wheel 60 in contact with it. The stripping tire 128 is still considered "in contact" or "movable contact" with the upper feed wheel 60 even though there may at times be document or an envelope between the upper feed wheel 60 and the stripping tire 128. In some embodiments, the clutch outer-hub 126 will be slipping through its drag clutch 127 at its designed torque until a second sheet enters a nip between the upper feed wheel 60 and the stripping tire 128. The upper feed wheel 60 is driven in clockwise (CW) by a motor in the direction of arrow G. The feed wheel 60 drives the stripping tire 128 in a counterclockwise (CCW) feed/rotational direction as shown by arrow F. Thus, the upper feed wheel 60 in turn drives the stripping tire 128 overcoming the drag torque of the drag clutch 127 of the outer hub 126. The upper belt/paddle motor 112 can drive the stripper shaft 105 in the CCW direction through gear 104 rotating the paddle wheels 118 in the feed direction. The one-way clutch 129 allows the stripper shaft to rotate without rotating the clutch assembly.

When stacking documents/sheets being returned to a customer of the ATM 10, documents travel from the CDS subassembly 78 in the direction of arrow H in a reverse/stacking direction. When documents are being returned/stacked, the stripping shaft 105 is driven CW (arrow I) by the belt/paddle motor 112 which in turn causes upper feed wheel 60 to be driven CCW (arrow J). Thus, the stripping shaft 105 drives the clutch inner-hub 124 and stripping tire 128 in the reverse/stacking direction through its one-way clutch 129 while the clutch outer-hub, 126 through its drag clutch 127 will drive the stripping tire 128, a one-way clutch 131 will prevent movement of the ground link 120. The stripping tire 128 may then be driven up to the design torque in the reverse/stack direction.

Figure 9:
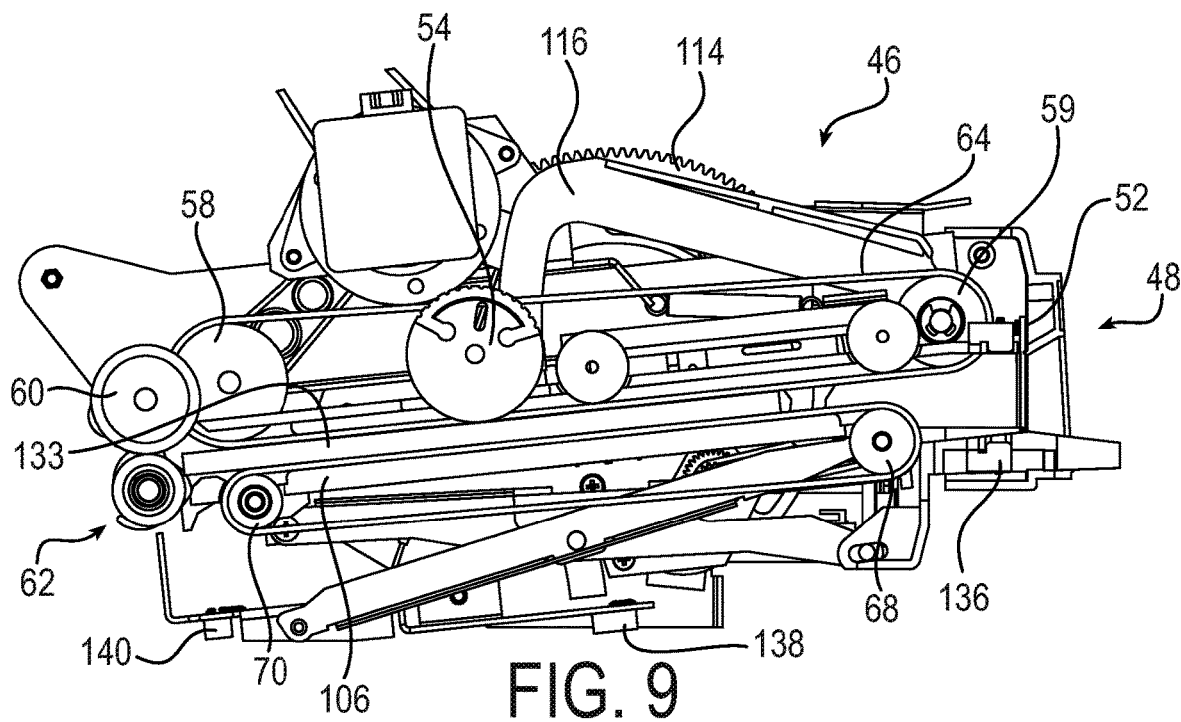
FIG. 9 illustrates an example embodiment of the transport subassembly positioned to send documents to the stripper assembly.

FIGS. 8-11 illustrate other details of the example embodiment of the deposit accepting apparatus 44 as it functions to receive documents 133 (e.g., media) for deposit or to be processed. In general, the deposit accepting apparatus 44 may accept one document or a stack of up to thirty or more documents inserted into its inlet 48. To accept media stack 133, the cam 114 will be rotated to a customer input position to move the gate 52 and lower platen 106. At the customer input position (FIG. 8), the gate 52 will be open and the lower platen 106 will be moved down to create some space for the media/document stack 133 being inserted. Once the lower platen 106 is down, a note stop solenoid 134 (best seen in FIG. 10) will be energized to move the note stop 116 down into position. After some time delay of the entry sensors 136 and middle sensors 138 being blocked, the cam 114 moves to the stack clamp/gate open position. The note stop solenoid 134 is also de-energized to allow the spring to lift the note stop 116 out of the paper path (FIG. 9). After another delay, the upper and lower platen belt motors are turned on to transport the stack 133 into the deposit accepting apparatus 44 as illustrated in FIG. 10. The rear, middle, and entry sensors 136, 138, 140 are monitored during the stack move by a processor such as the terminal processor 32 or a local processor 178 to keep track the position of the stack 133. The stack 133 is eventually positioned a number of millimeters beyond the rear sensors 140. Once the stack 133 is in this position and if the entry sensors 136 are clear, the cam 114 will move the gate 52 to a closed position. In this position, the stack 133 is ready to be transported into the CDS subassembly 78. However, if a shutter closed sensor (not illustrated) is blocked when the cam 114 is at the sprung closed position, the cam 144 will continue to move to a home position.

Media feeding is the process of breaking down a stack into individual sheets that can be processed by the rest of the ATM 10 as discussed above with reference to FIGS. 5-7. In some configurations, prior to feeding the first piece of media, the thumper wheel 54 should have been parked at home and the stack 133 should be positioned over the rear sensors 140 of the transport subassembly 46. To begin the feeding, the thumper position first needs set. The lower platen 106 is lowered until the thumper position sensor 142 is clear. Then it is raised until the thumper position sensor 142 is blocked plus some number of steps of its drive motor. This sets the top of the stack 133 to the right position of FIG. 10 to begin the feeding into the CDS subassembly 78. A single sheet at a time is removed from the stack 133 by the stripper assembly 62 and moved into the CDS subassembly 78 as discussed above with reference to FIGS. 5-7. As illustrated in FIG. 11A, when feeding documents one at a time into the CDS subassembly 78, the arms 150A-C of the paddles 118 due to contact with the stack or sheet. As illustrated in FIG. 11B, when stacking and returning a document 148 to a customer, the arms 150A-C of the paddles 118 are spinning the CW direction of arrow N and are also projected outward in elongated shapes due to centrifugal forces acting on the arms 150A-C and contact with the stack and sheet. Distal ends 154A-C of these elongated arms 150A-C may knock the end 149 of a document 148 downward in the direction of arrow O onto a media stack 133 resting on the lower platen 106.

In some example configurations, the thumper position sensor 142 will also be read after each sheet is fed into the CDS subassembly 78. When the thumper position sensor 142 stays clear after a sheet is fed, the lower platen 106 is raised again to desired position. In some configurations, once the position is set the cam motor should be held to prevent a spring from moving the top of the stack out of position. With the takeaway solenoid de-energized to open the pinch between the feed wheel 60 and stripping tire 128, the upper transport belt 64 is run in the feed direction. After some number of steps, a feed motor is also run in the feed direction. As understood by those of ordinary skill in the art, both motors may now be run until the takeaway sensors 144 (FIG. 10) are blocked plus optional additional steps. If the double detect sensors 146 do not detect multiple sheets, the feed cycle is complete.

During a takeaway process of moving a document from the transport subassembly 64 to the CDS subassembly 78, the takeaway solenoid will be energized to pinch a document and the CDS transport motor will be used to move the sheet from the transport subassembly 46 and into the CDS subassembly 78. The feed motor will run at matched speed along with the CDS transport until the thumper wheel 54 has made it back to home. If during the feed cycle the thumper wheel 54 has made it back to home without the takeaway sensors 144 being blocked, a mispick has occurred and the motors are stopped and new feed cycle may be attempted. If during a feed cycle multiple sheets are detected by the double detect sensors 146, the feed and upper platen motors will be stopped. The cam 114 will be rotated to the stacking position and sheets will be restacked following the stacking procedure described below. Once the restack has completed the cam 114 can be rotated back, the stack height can be reset with the thumper position sensor 142 and a new feed cycle may be attempted. During the restack operation the feed motor should stop with the thumper wheel 54 in the at home position so that its rubber portion 56 is out of the way and ready for feeding or returning the document stack 133.

Figure 12:
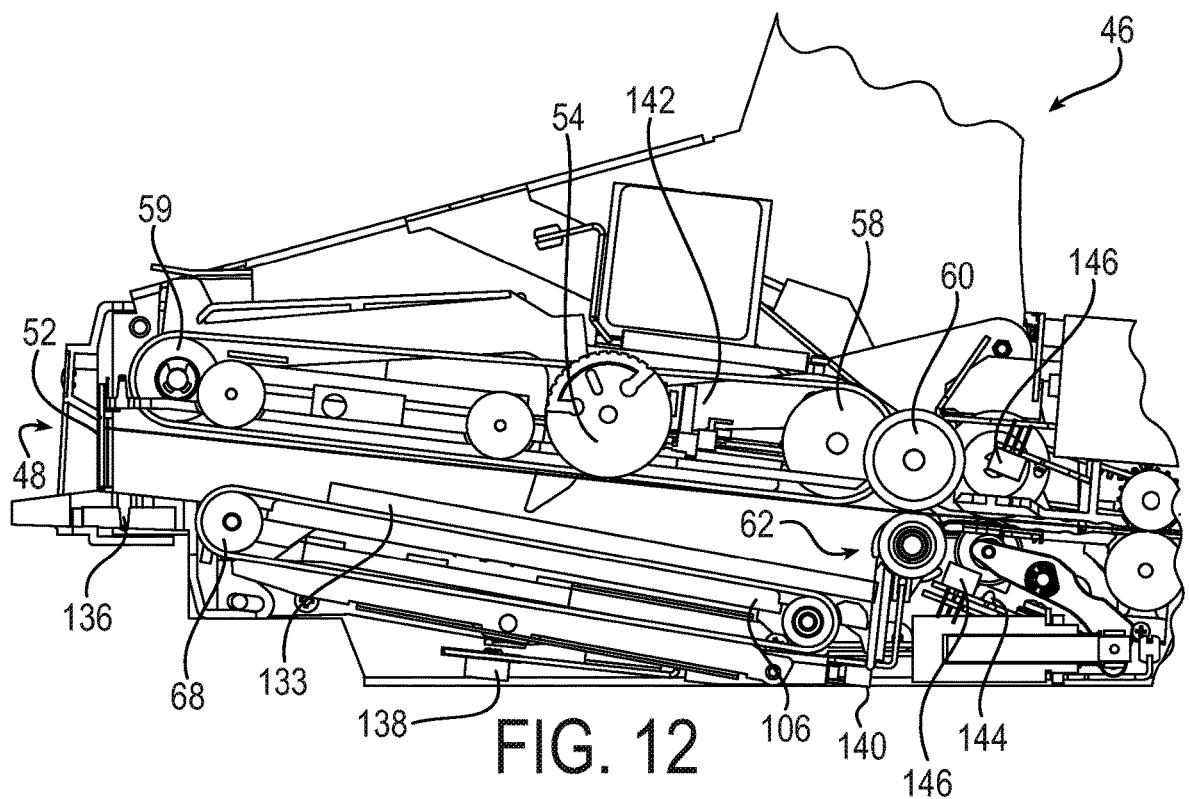
FIG. 12 illustrates an example embodiment of the transport subassembly positioned to receive documents being returned to a customer.
Figure 13:
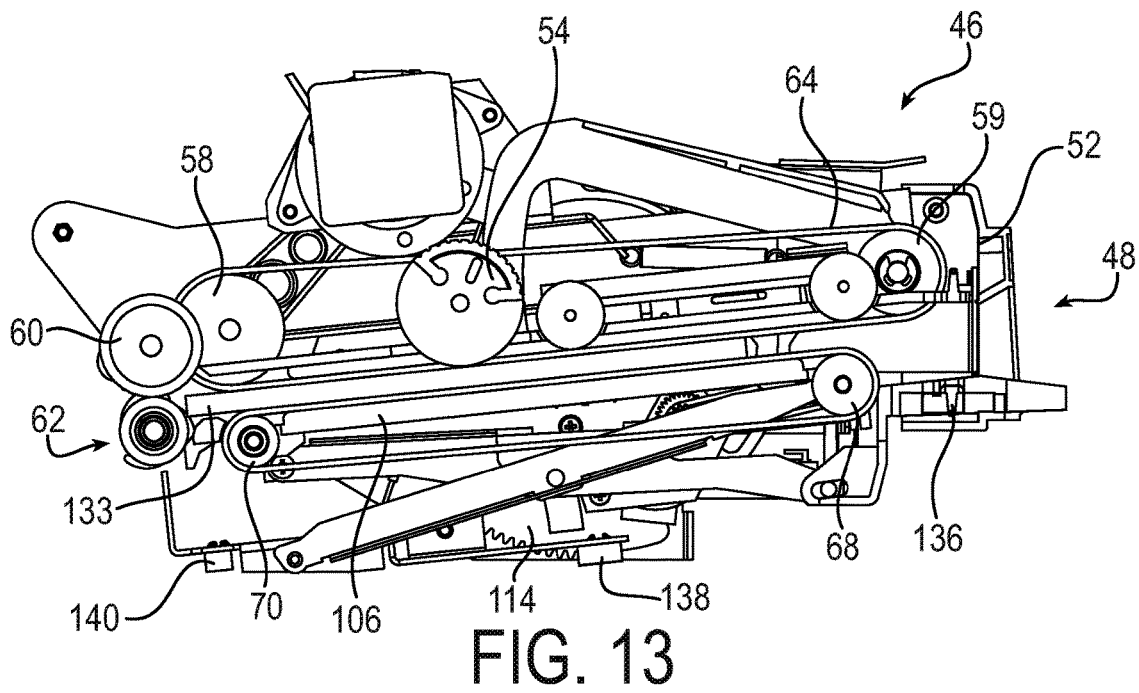
FIG. 13 illustrates an example embodiment of the transport subassembly with raised documents to be returned to a customer.
Figure 14:
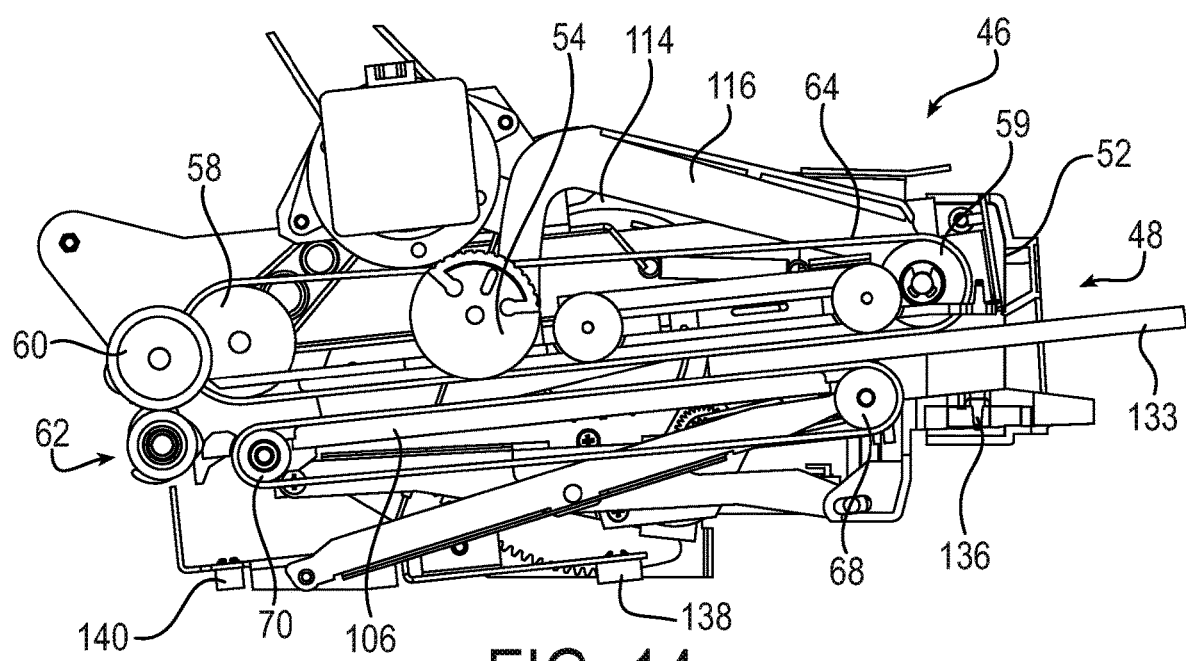
FIG. 14 illustrates an example embodiment of the transport subassembly returning documents through a gate to a customer.

Stacking media is used to return media to the customer interface area as Illustrated in FIGS. 12-14. Some of the reasons for restacking media include: media being returned after the of escrow process, double media has been detected, some media cannot be aligned, some media are too short or too narrow and a user has cancelled a transaction. To stack the media, the cam 114 is rotated into the stack position as seen in FIG. 12. In the stack position, the lower platen 106 is moved and rotated to create space for stacking notes (e.g., media/documents). The upper platen motor is then driven at transport speed in the stack direction to drive the paddles 118 and clutch assembly (e.g., feed stripper pinch). Although the feed motor cannot drive the feed wheel 60 in the stack direction due to the one-way clutch, it will still be indirectly driven at or above transport speed by the stripping tire 128 to prevent the upper transport motor from rotating the feed motor. As understood by those of ordinary skill in this art, the note stop 116 will be actuated by energizing the note stop solenoid for each piece of media being stacked at a calculated distance of the trail edge moving into the stacking area. This allows the note stop 116 to pinch the media being stacked against the lower platen 106 or top of the stack to prevent it from moving too far towards the gate 52 and out of the reach of the paddles 118. Also, and as previously mentioned above and as illustrated in FIG. 11B, the arms 150A-C of the paddles 118 spinning the CW direction are also projected outward in elongated shapes due to centrifugal forces acting on the arms 150A-C. This allows distal ends 154A-C of the elongated arms 150A-C to knock the end 149 of a document 148 downward in the direction of arrow O onto a media stack resting on the lower platen 106.

To return a medial/document stack 133 to the customer, the cam 114 is rotated to a stack clamped/gate open position to open the gate 52 (FIGS. 13 and 14). Then the upper 64 and lower belts 74 will run in the direction toward the customer to return the media/document stack 133 to the customer as seen in FIG. 14. The rear, mid and entry sensors 136, 138, 140 may be used to monitor the medial/document stack 133 during its movement. This movement may be complete when the trail edge of the stack 133 has moved some distance beyond the middle sensors 138.

Figure 15:
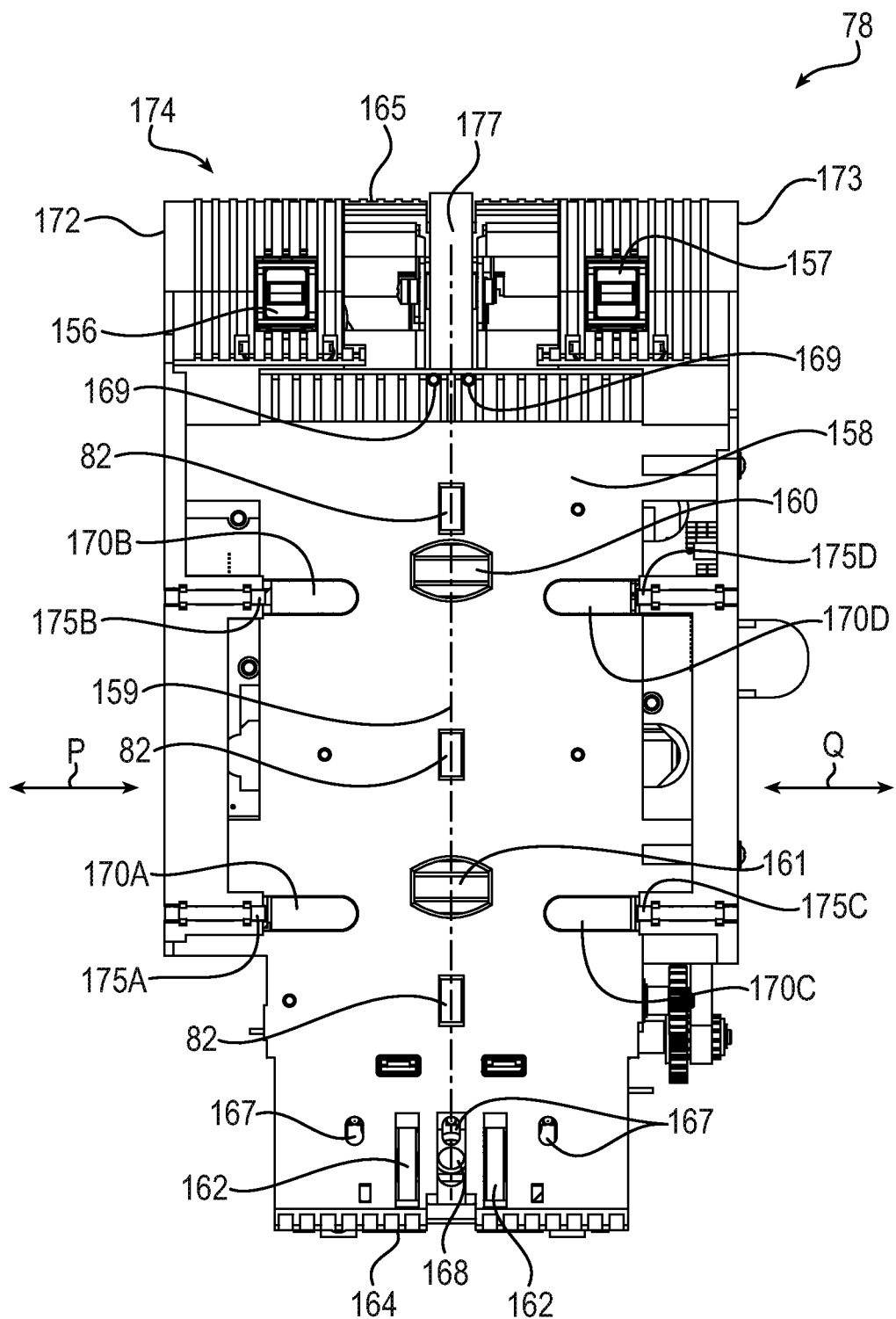
FIG. 15 illustrates an example bottom view of an embodiment of the upper center de-skew subassembly.

FIGS. 15-17 illustrate and example embodiment of the center and de-skew (CDS) subassembly 78 in more detail. Before describing the components of the CDS subassembly 78 in more detail, its functionality is briefly introduced. In general, the CDS subassembly 78 aligns a document about a centerline of a path the document is to travel. In some exemplary embodiments, the CDS subassembly 78 performs one or more of (1) determining if a picked check is a single piece of media, (2) accepting the single document by pulling it out of the transport subassembly 46 and transporting it into the CDS subassembly 78, (3) centering the document about the centerline of the paper path and removing skew and (4) transporting the document past MICR heads 156, 157 (FIG. 15) and into the main transport 84. In at least one embodiment, the CDS subassembly is intended to accommodate a large range of media sizes lengths between 150 and 222 mm, widths between 63 and 103 mm and thicknesses of between 0.07 and 0.18 mm and operate at a speed of at least about 0.7 seconds between processed checks.

Some of the components of the CDS de-skew include a upper-central plate 158 with a front end 164 and a back end 165. The upper-central plate 158 further has a centerline 159 corresponding to a centerline with a path which documents are to travel in the deposit accepting apparatus 44. FIG. 15 is a bottom view of the upper-central plate 158 shown from a document path side. The CDS transport rollers 82 are mounted on the upper-central plate 158 with a CDS rear translate/rotate idler wheel 160, CDS front translate/rotate idler wheel 161, and CDS takeaway rollers 162. Sensors mounted near the front end 164 of the upper-central plate 158 include three post takeaway sensors 167 and an ultrasonic double detect sensor 168. Elongated openings 170A-D are formed near the edges of the upper-central plate 158. In some embodiments, a rear drive/pincher wheel 177 may be mounted near the back end 165 of the upper-central plate 158. However, this drive wheel 177 may be considered part of and driven by the main transport 84 and is no longer discussed here.

A CDS right MICR plate 172 and a CDS left MICR plate 173 are movably attached to the upper-central plate 158. These plates 172, 173 have the right and left MICR heads 156 and 157 mounted to them as illustrated. Edge detection sensors 175A-D are mounted to the right and left MICR plates 172, 173 so that they align with elongated openings 170A-D of the upper-central plate 158. The CDS right MICR plate 172 and the CDS left MICR plate 173 are attached to a drive mechanism (not shown) so that they can be driven in tandem/synchronously back and forth in the directions of arrow P and Q relative to the central transport 158. As understood by those of ordinary skill in the art, any suitable drive mechanism may be used to drive the MICR plates 172, 173 in the directions of arrows P and Q. For example, an electric CDS plate motor 174 (not illustrated but is located on the top side of FIG. 17) may drive one or more gears to move MICR plates 172, 173. In one embodiment, the plates may be connected through gear rack and be mechanized such that they move an equal distance in opposite directions per motor movement. For example, the MICR plates 172, 173 may be each engaged by a 24T Mod1 gear that is in turn driven by a 14T Mod1 gear on the end of the 17PM stepper motor, which has a resolution of 400 pulses per revolution. This example drivetrain may create a mm/step rate of 0.11 mm/step.

FIG. 16A illustrates when the lower CDS subassembly 80 has its CDS idler transport rollers 82 projected upward, above the upper-central plate 158 and with its CDS rear translate/rotate idler wheel 160 and CDS front translate/rotate idler wheel 161 (translate rollers) cammed downward in retracted positions. In contrast, FIG. 16B illustrates when the upper CDS subassembly 80 has its CDS transport rollers 82 retraced above the upper-central plate 158 and with its translate/rotate wheels 160, 161 projected downward below the upper-central plate 158. As understood by those of ordinary skill in the art, any suitable method/device may be used to raise and lower CDS transport rollers 82 and translate/rotate wheels 160, 161 as needed. For example, in one embodiment a transport motor 179 (not illustrated but is located on the top side of FIG. 17) may be used at different times to drive gears that drive the CDS transport rollers 82 and at a different time to drive gears that drive a CDS cam 181. In one example embodiment, the CDS transport rollers 82 and translate/rotate wheels 160, 161 are moved into their various positions by driving a 48 step PG25 stepper motor with an internal gear box ratio of 30.3 to 1. This same motor may be used for the CDS transport rollers 82, but with a different gear on the output shaft. The gear used in this location may be a 16T Mod1 gear.

In some embodiments, the SDC subassembly 78 may implement a dwell between the up and down movement of the CDS translate idlers (translate wheels) and transport idlers (transport wheels). This means that at a point during the camming between the idler sets, all idlers are down during the transition to prevent the document that is to be de-skewed from shifting. The CDS cam 181 may have a "CDS Cam Translate" vane sensor that shows "clear" at each end of the cam's stroke. Thus, when the "CDS Cam Translate" vane sensor is clear, the mechanism is in a position to either center and de-skew the document or to transport the document.

In some embodiments, each CDS rear translate/rotate idler wheel 160 and front translate/rotate idler wheel 161 are controlled by independent CDS wheel motors 183A-B (FIGS. 16A-B) allowing these wheels to be driven in opposite directions. The CDS rear translate/rotate idler wheel 160 and front wheel 161 are cammed together so that they may work together to translate and/or rotate a document in order to center and de-skew the document relative to the edge detection sensors 175A-D.

Having described the exemplary components of the CDS subassembly 78, its use and operation are now described with reference to FIGS. 17A-D. In one embodiment, the CDS subassembly 78 prepares to receive a document from the transport subassembly 46 by performing some initialization actions. One initial action may include checking to first ensure the MICR plates 172, 173 are closed. For example, terminal processor 32 or one or more other logics may check a "Main Transport Latched" sensor is checked to ensure the CDS assembly is closed. Once this is done, the "CDS Plates Closed" sensor would be checked to ensure the plates are in the closed position. Then, all paper path sensors can be checked to ensure no documents are detected in the transport before the first piece of media arrives. Once these are complete, then the plates would open to the "CDS Plates Open" sensor position.

Figure 17A:
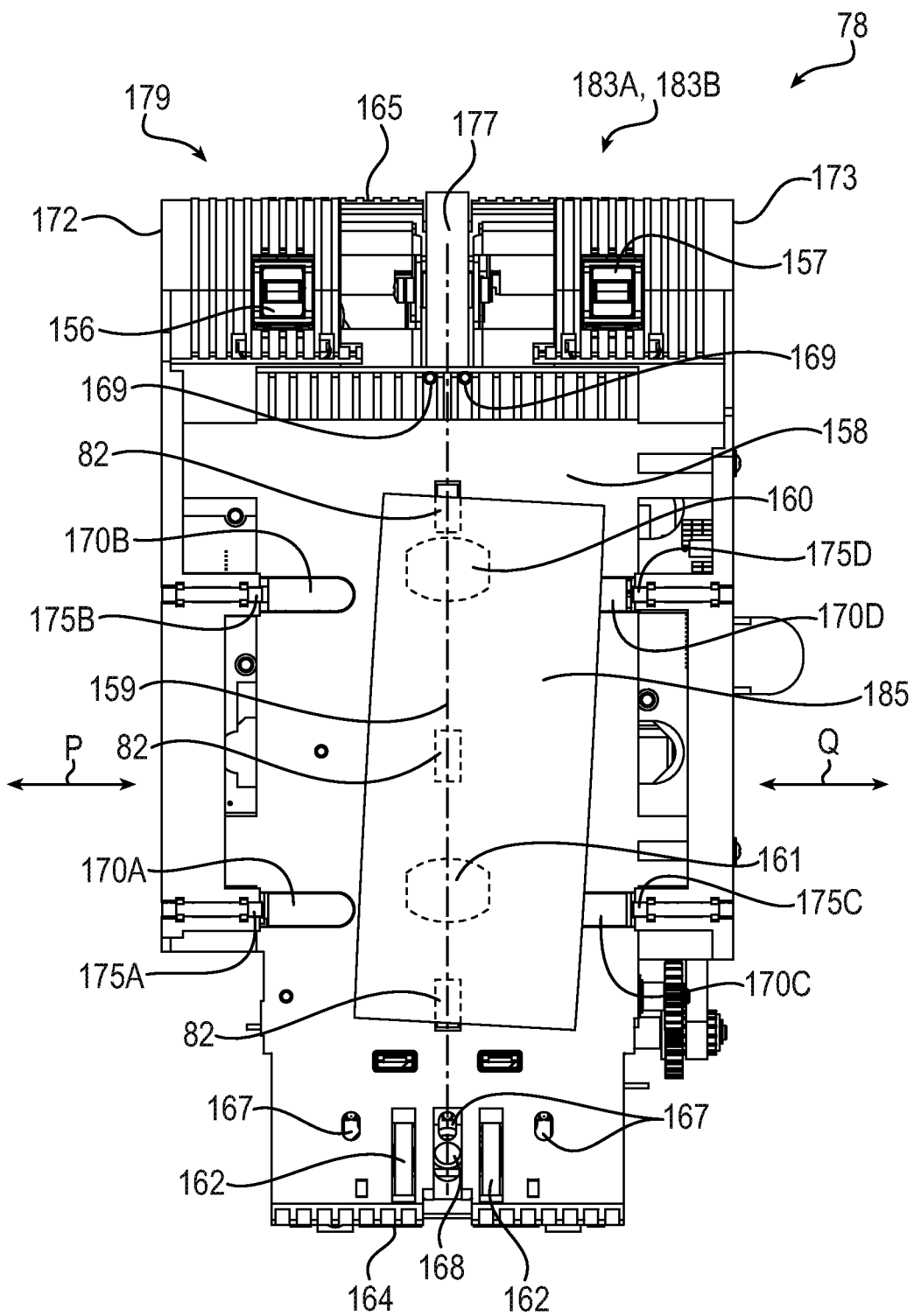
FIGS. 17A-D illustrate example bottom views of the upper center de-skew (CDS) subassembly in operation.
Figure 17B:
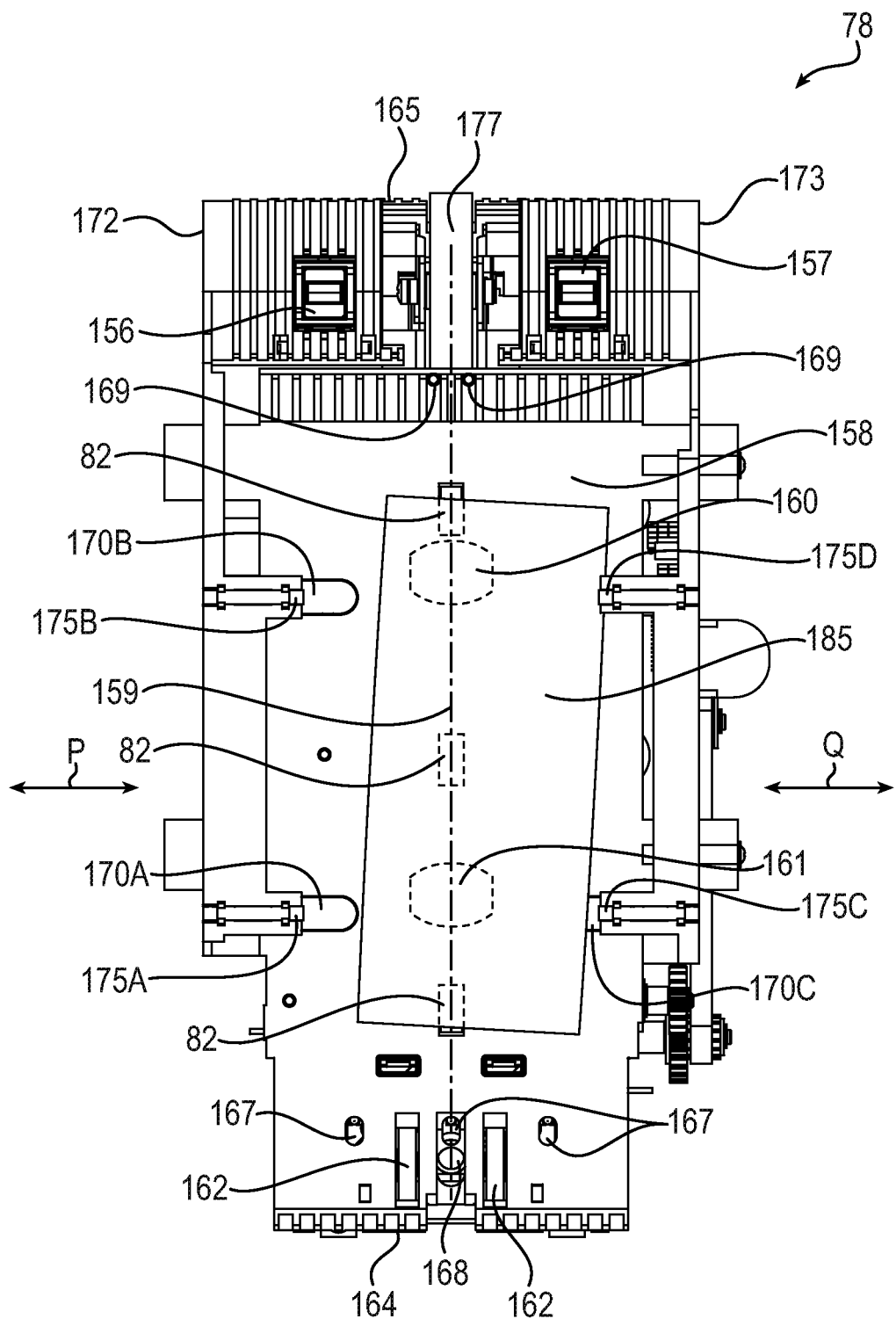

In one example embodiment, the CDS plates motor 174 mentioned above may be used to fully close the MICR plates 172, 173 so that they are in a "CDS Plates Closed" position when a vane sensor is clear. After the plates are closed the CDS transport motor 179 is moved to a transport position and its current is removed. During initialization, a check that all other sensors are clear may be performed, including checking the double detect sensor 168, the post takeaway sensors 167, the edge detection sensors 175A-D and the "Pre-MICR sensor 169. To complete initialization in this embodiment, the CDS plates motor 174 is now energized to move the CDS MICR plates 172, 173 to a fully open position as shown in FIGS. 17A and 17B so that a CDS Plates Open vane sensor is cleared.

In this exemplary embodiment, the next task is for the CDS subassembly 78 to receive a document 185 from the transport subassembly 46. After the lead edge of the document 185 has been fed into the front end 164 of the CDS subassembly 78 by the transport subassembly 46, the double detect sensor 168 is used to validate that only a single document is being received. If only one document is being fed, then a pick takeaway solenoid located in the lower CDFS (FIG. 16) is energized to engage the takeaway pinpoint rollers 161 in the upper CDS (FIG. 15). In other embodiments, other takeaway devices and methods may be used. Next, the CDS transport motor 179 is run to engage the transport idlers, that will be used to move the document 185 from the takeaway of the transport subassembly 46 and transport it into the CDS subassembly 78 as illustrated in FIG. 17A. The CDS transport motor 179 is run until the document 185 is fully in the CDS subassembly 78 and then the motor 179 is ramped down and held so that the document is centered between the post takeaway sensors 167 and the pre-MICR sensors 169.

After the document 185 has been received, the de-skewing process begins. De-skew begins by moving the CDS transport motor 179 until the "CDS Cam Translate" vane sensor goes unblocked allowing engagement of the CDS translate/rotate wheels 160, 161 with the document 185 and to remove the transport rollers 82 from the document 185. Before moving the CDS plates motor 174 to close the CDS MICR plates 172, 173 a check is made by the terminal processor 32 or another processor to determine if any of the four edge detection sensors 175A-D are blocked. If an edge detection sensors 175A-D is blocked, then the closest CDS wheel motor 183A or 183B is run away from the blocked sensor, until the edge of the media is found (FIG. 17B). If no sensor is blocked, then the CDS plates motor 174 is run to close the CDS MICR plates 172, 173 while at the same time monitoring all four edge detection sensors 175A-D for a document edge blocked event.

Figure 17C:
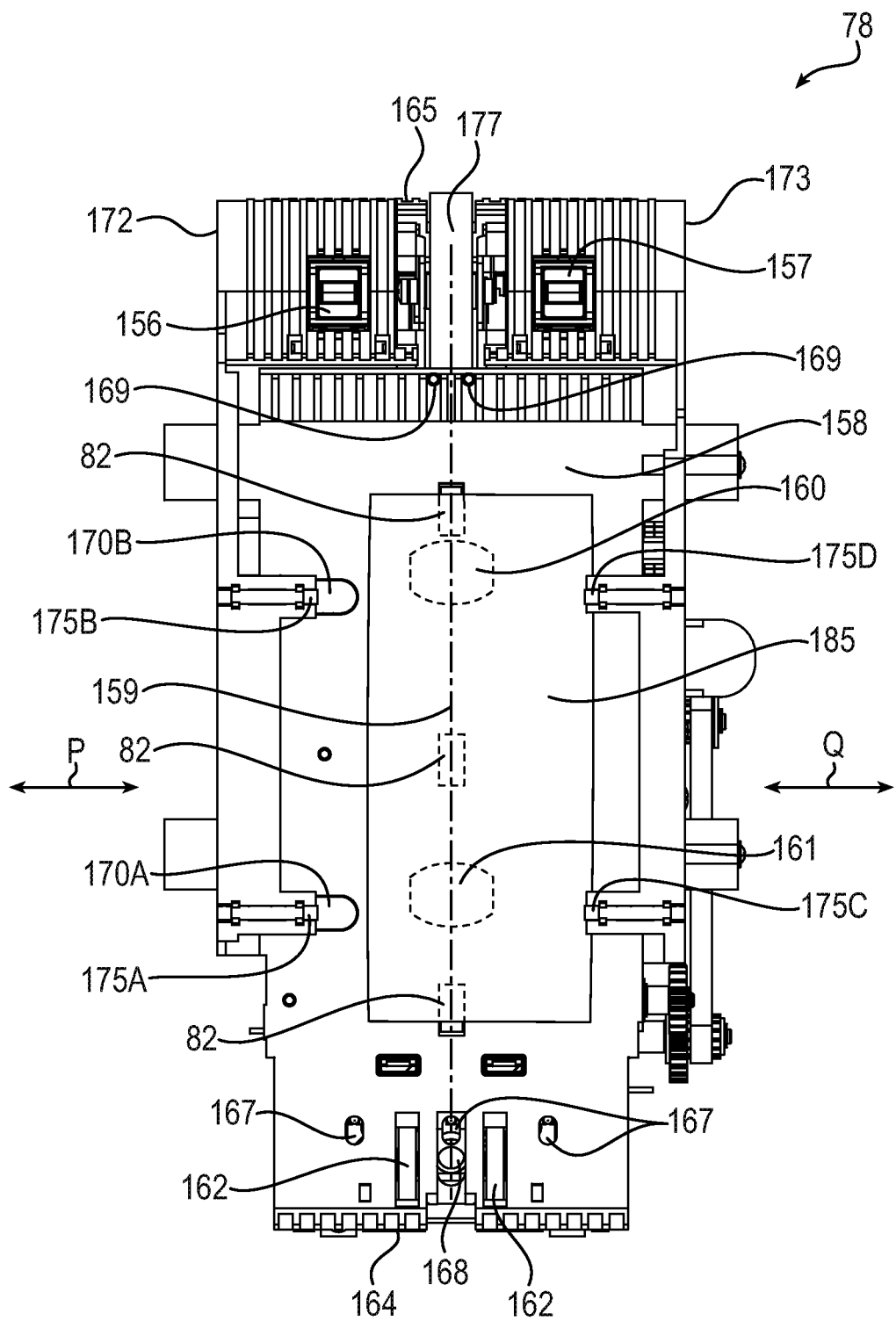
Figure 17D:
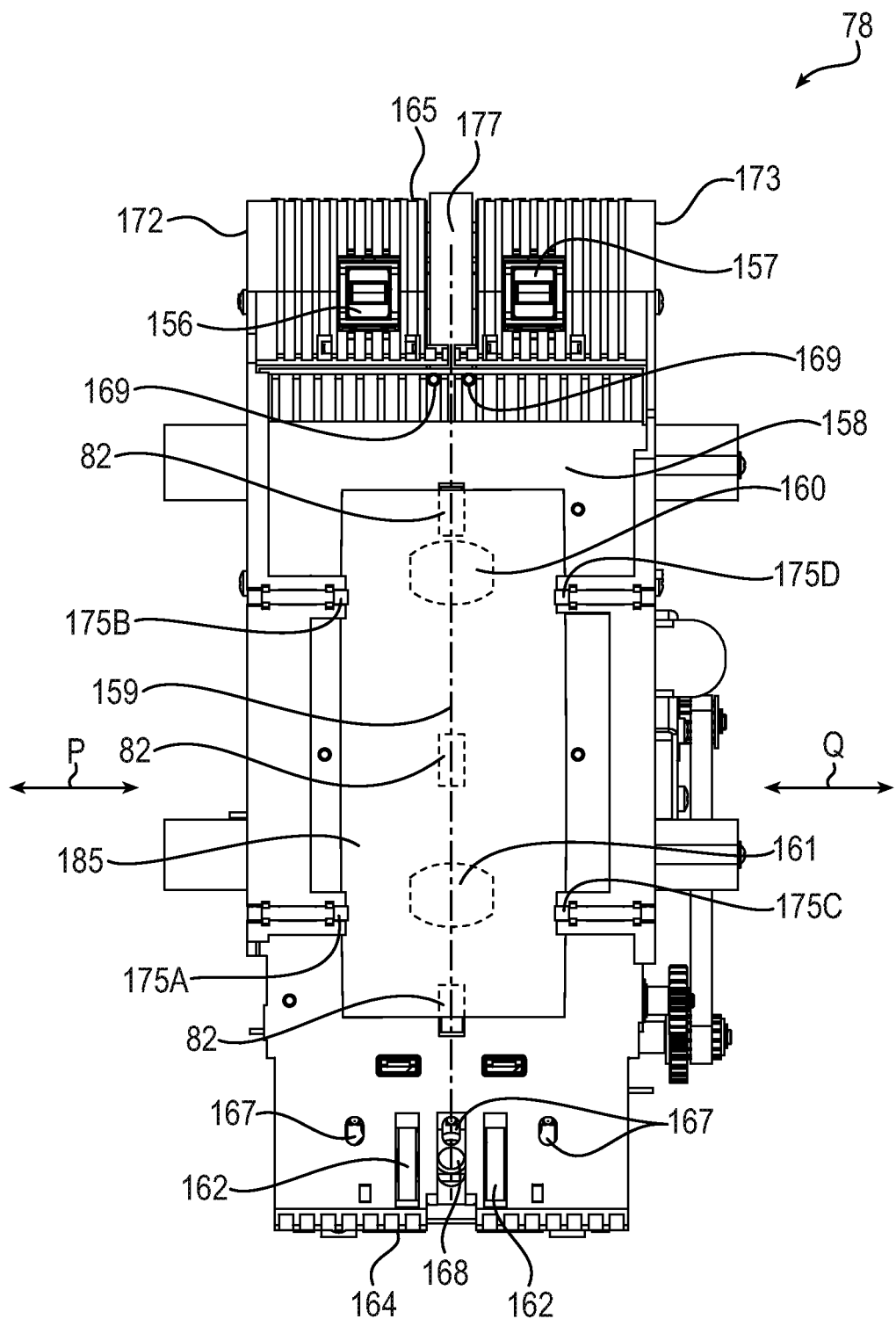

Once a document edge partially blocks one of the edge sensors 175A-D (FIG. 17B), the terminal processor 32 or another logic begins moving the CDS Wheel Motor 183A or 183B closest to the blocked sensor towards the center of the document path, while continuing to run the CDS plates motor in the plate closing direction. The CDS wheel motor 183A or 183B and CDS plates motor 174 should continue to run together (at the same step rate), until the next edge sensor goes blocked as illustrated in FIG. 17C. The next edge detection sensor 175A-D that should go blocked will either be the sensor on the same MICR plate as the initial blocked edge sensor, or the sensor diagonal from the initial blocked edge sensor. In some configurations, the only time the adjacent sensor (opposite paper path centerline on other MICR plate) should be the next sensor blocked is if it blocks at the same time as the rest of the edge sensors.

In some embodiments, each of the edge detection sensors 175A-D in combination with a processor 32 or other suitable logic may determine what percentage of a sensor 175A-D is covered. For example, it may be determined that an edge of a document is located at a sensor when 40-60 percent, or another desired percent, of an individual sensor has been covered up by an edge of a document.

The other CDS wheel motor 183A or 183B that has not yet run, should now be turned on and run in whichever direction allows it to maintain its edge contact with the second sensor that was blocked, as the MICR plates continue to move inward to align with the document path centerline. Additionally, the CDS plates motor 174 and the CDS transport motor 179 are moved in the same direction until the third (and likely fourth) edge sensors become partially blocked. At this point, the document 185 should be grossly aligned and will likely require a "fine align" to ensure that at least three of the four edge sensors have achieved a desired voltage on the corresponding detectors, at which point the document may be deemed fully centered and de-skewed.

After the document is de-skewed, its prepared and transported to MICR read heads 156, 157. This process begins by running the CDS transport motor 179 until the "CDS Cam Transport" vane sensor goes unblocked, to engage the transport rollers 82 with the document 185 and remove the CDS translate/rotate wheels 160, 161 from the document 185.

The CDS transport motor 179 is then ramped up to run the CDS transport wheels 82 at a desired transport speed to transport the document 185 onto the main transport 84 and to the escrow/printer subassembly 86. The CDS plates motor 174 is off until the trail edge of the document 185 clears the Pre-MICR sensor plus about 50 mm. As documents leaving the CDS subassembly are center aligned, any magnetic indicia on them should be aligned with the centers of either the right or left MICR read head sensor 156, 157, respectively. This is because document such as bank checks have a specification requiring magnetic ink to be place a fixed distance from an edge of the check. Thus, either the right MICR head 156 or the left MICR head 157 is needed to read magnetic ink from a center aligned document as it is transported out of the CDS subassembly 78. After the centered document exits the CDS subassembly, the CDS plates motor 174 is run until the MICR plates 172, 173 are back to the fully open position (FIG. 17A) where the "CDS Plates Open" vane sensor should be unblocked. The CDS transport motor 179 may continue to run to bring the next document into the CDS subassembly 78, to repeat the sequence.

Figure 18:
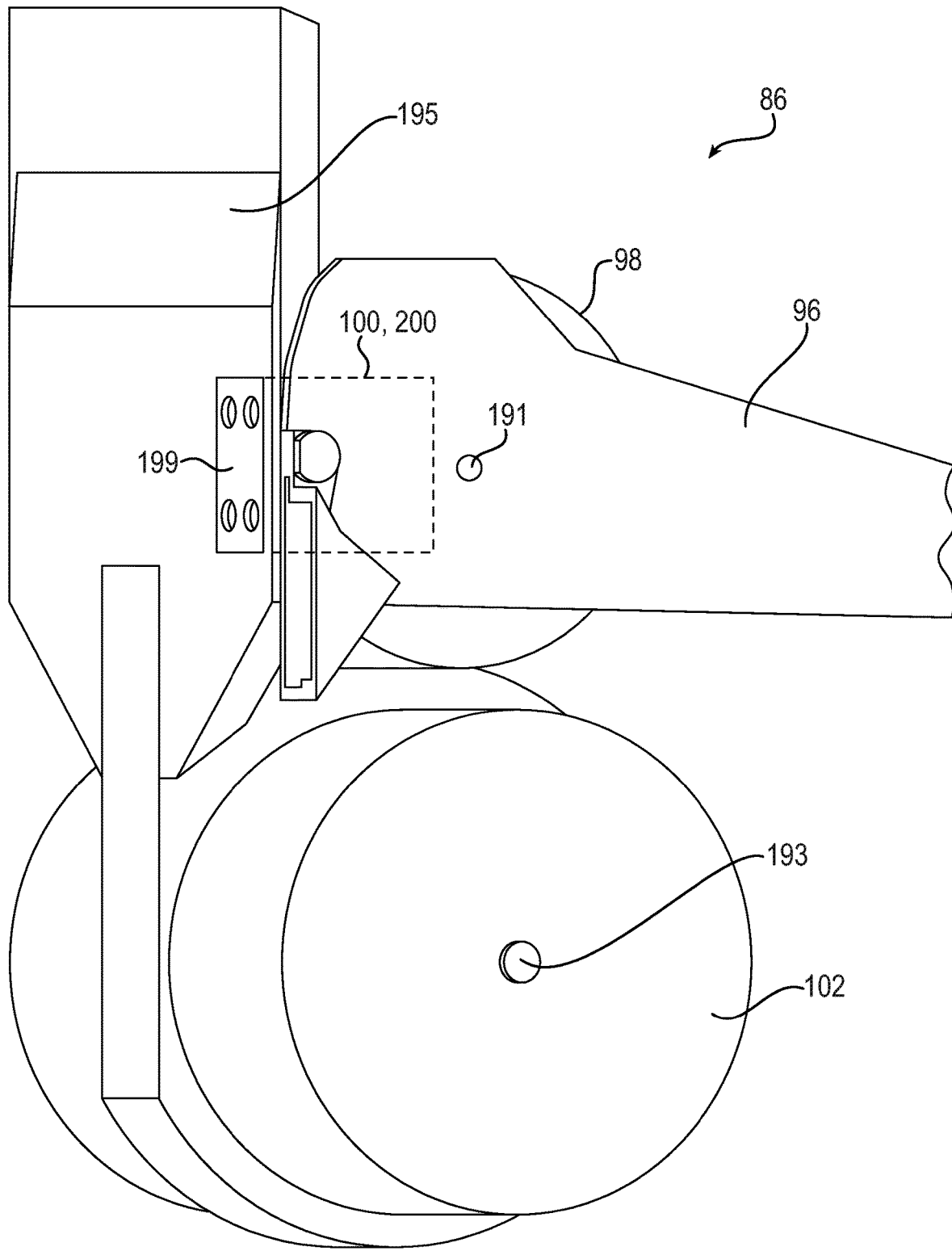
FIG. 18 illustrates an example view of an embodiment of an escrow printer subassembly with its printer oriented horizontal.
Figure 19:
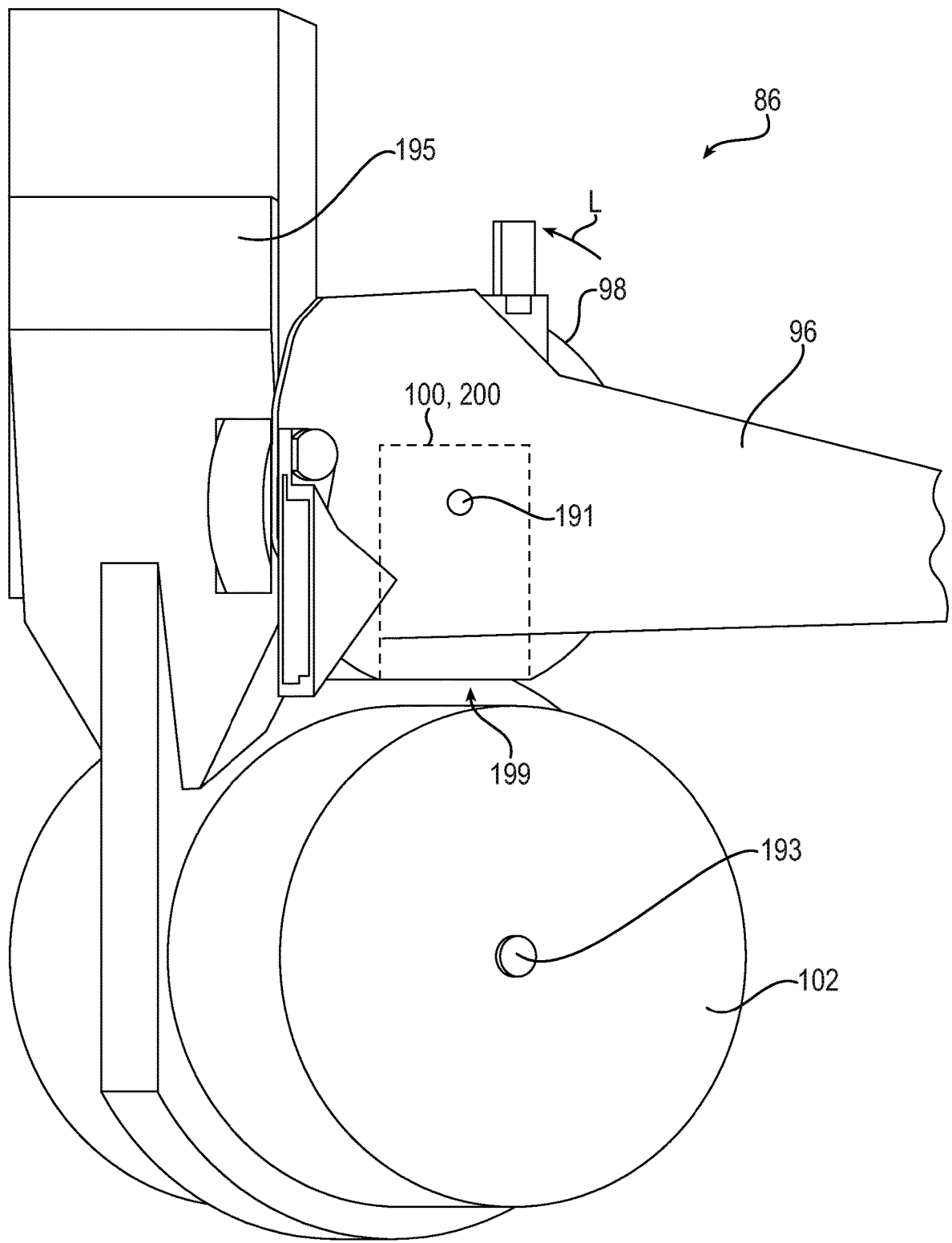
FIG. 19 illustrates an example view of the embodiment of the escrow printer subassembly with its printer oriented vertical.
Figure 20:
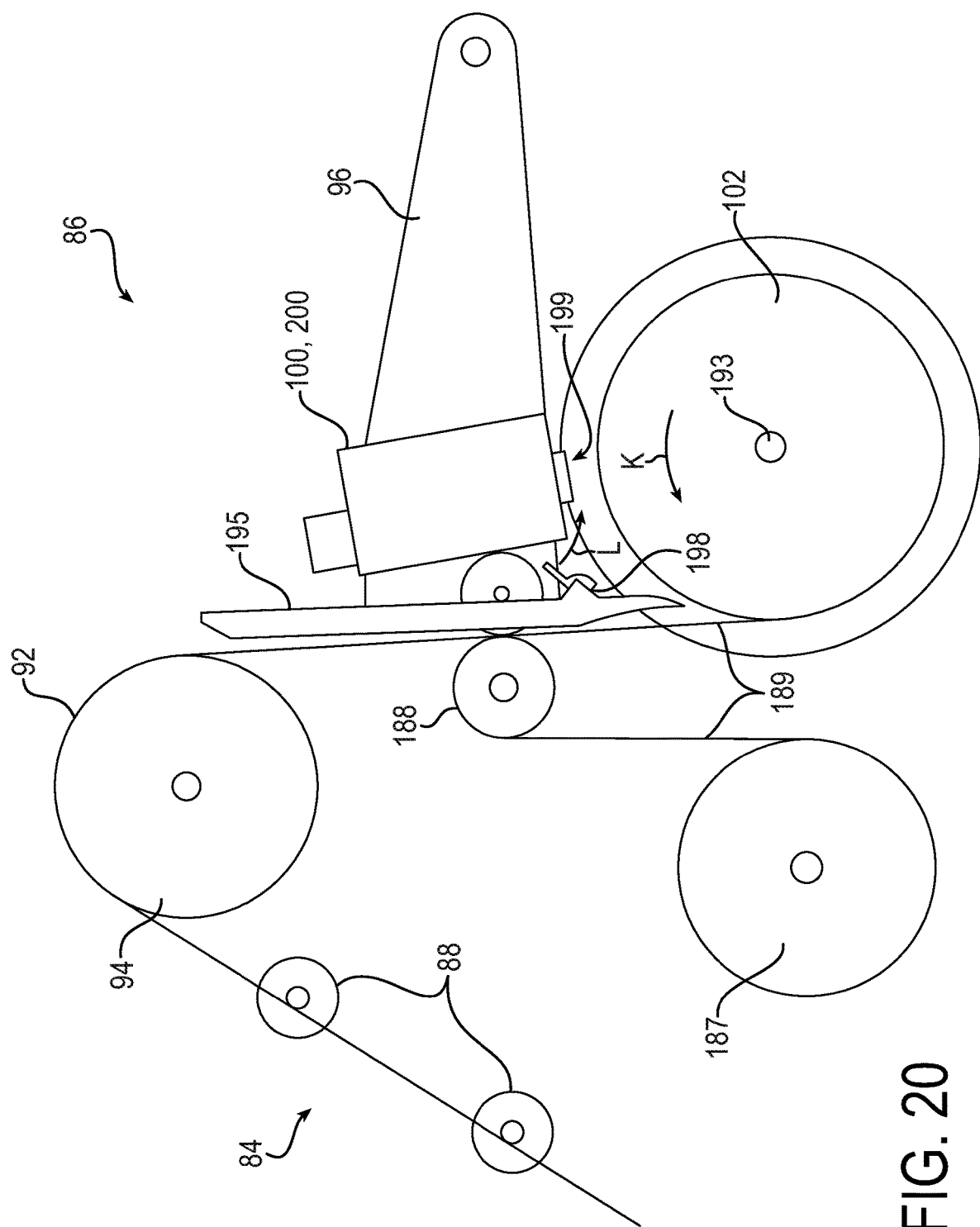
FIG. 20 illustrates an example view of the embodiment of the escrow printer subassembly with its printer oriented horizontal.

FIGS. 18-20 illustrate further details of the escrow printer subassembly 86 previously introduced above. As mentioned earlier, the escrow printer subassembly 86 includes an upper transport 92 (FIG. 20), an upper transport wheel 94, a support arm 96, a pivotal printer support 98, a printer 100 and a document spool 102. The printer subassembly 86 further includes a tape feed wheel 187, a middle tape wheel 188 and a printer transport guide 195. The pivotal printer support 98 rotates about an axis 191 to allow the printer 100 to print on one or both sides of a document (e.g., check) as discussed below. The tape feed wheel 187 feeds tape 189 to (or from) the middle tape wheel 188. The document spool 102 receives tape from middle tape wheel 188 while rotating in the direction of arrow K about axis 193 when receiving documents. The printer transport guide 195 further includes an ink scraper 198 (FIG. 20) formed with an edge/surface for scraping ink off a print head 199 of an ink/print cartridge 200 of the printer 100 to prolong the life of the cartridge 200.

In operation, an embodiment of the escrow printer subassembly 86 receives documents that travel downward adjacent the printer transport guide 195. In one example embodiment, documents travel in the escrow printer subassembly 86 with a gap between documents so that sensors may track front and/or back edges of the documents as understood by those of ordinary skill in the art. As best seen in FIG. 18, as the documents travel downward, they may have one of their sides (a first side) printed on by printer 100 when the printer 100 is positioned in a horizontal position. Eventually documents being received travel downward so that they travel between middle tape wheel 188 and the printer transport guide 195.

Reaching the middle tap wheel 188 begins a process of moving (e.g., sandwiching) documents between the document spool 102 and the tape 189 or adjacent layers of tape 189 while they proceed from the tape feed wheel 187 to the document spool 102. As best illustrated in FIG. 20, tape 189 begins leaving the printer transport guide 195 near the middle tape wheel 188. As the document leaves the lower end of the printer transport guide 195 it begins to be wound onto the document spool 102 between the document spool 102 and the tape 189 as the document spool 102 rotates in the direction of arrow K in a counter clockwise direction when receiving documents. After the first revolution of the document spool 102, documents will continue to be wound onto the spool 102 between a layer of tape 189 already on the spool 102 and a new layer of tape 189. As previously mentioned, in some exemplary embodiments it may be desirable to maintain a gap between front and back edges of documents being wound onto the document spool 102 in order to facilitate removing documents from the spool 102. Documents may be removed from the document spool 102 by running the spool in a clockwise direction and by reversing directions of the tape feed wheel 187, middle tape wheel 188 and other moving components of the upper transport 92.

When documents travel downward on the printer transport guide 195 and the printer is in the horizontal position (FIG. 18) the printer 100 may print on the side (e.g., first side) of a document facing the printer 100 so that this side is wound onto the document spool 102 facing "down" or facing toward its axis 193. Alternatively or additionally, the printer 100 may be rotated in the direction of arrow L (FIGS. 19 and 20) about axis 191 so that it is pointed downward toward the document spool 102. Now, as a document that has just been placed on the spool 102 reaches an upper position on the document spool 102 located under the print/ink cartridge 200, the other (e.g., second side) that is faced upward or outward from the document spool 102 and its axis 193 may be printed on while the printer 100 is positioned in the vertical direction. Caution may be used to be sure that the tape 189 is not overlapping an area of a document to be printed so that the printer 100 has access to an area of the document to be printed upon.

Figure 22:
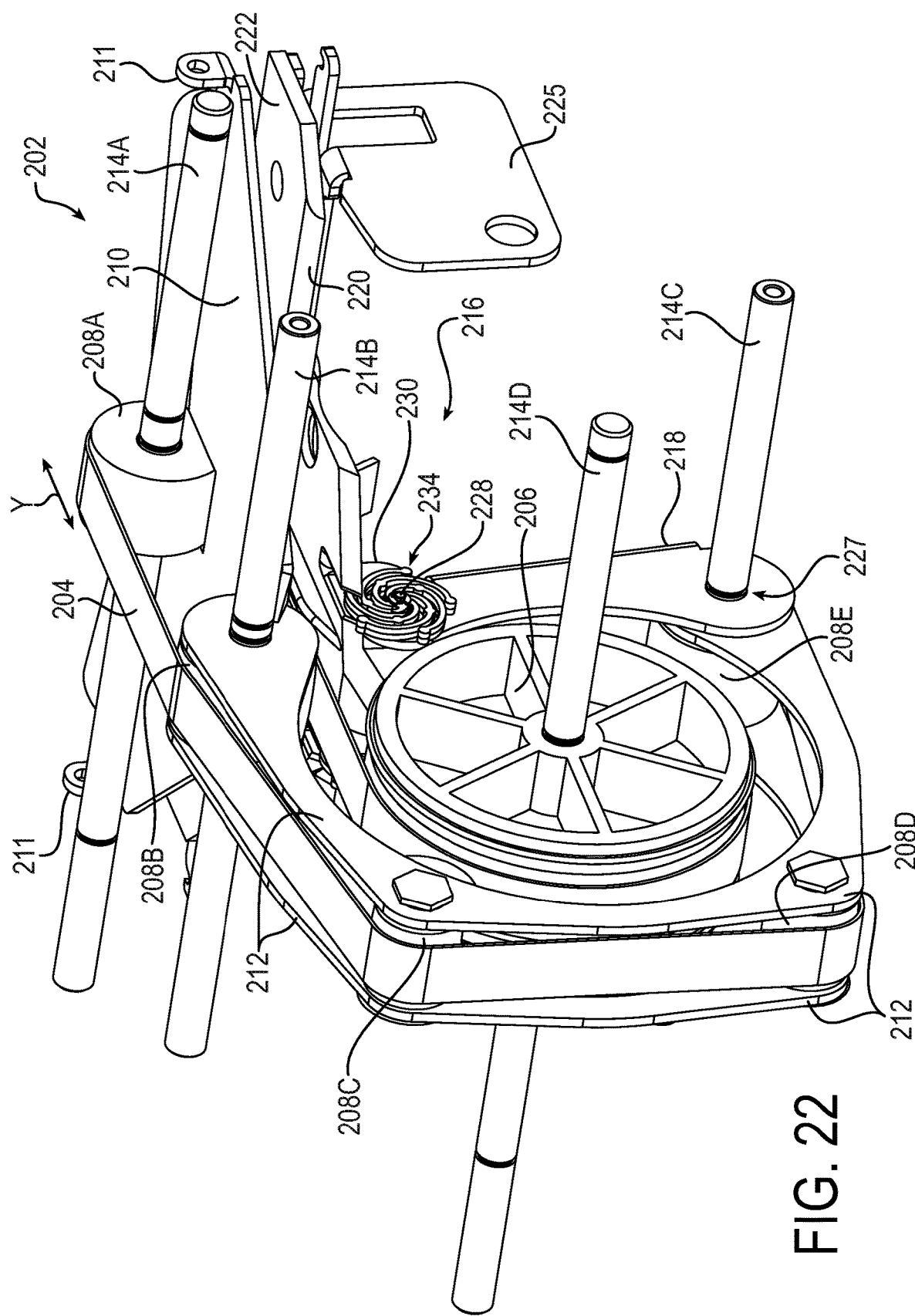
FIG. 22 illustrates an example front-right perspective view of the embodiment of the escrow subassembly.
Figure 23:
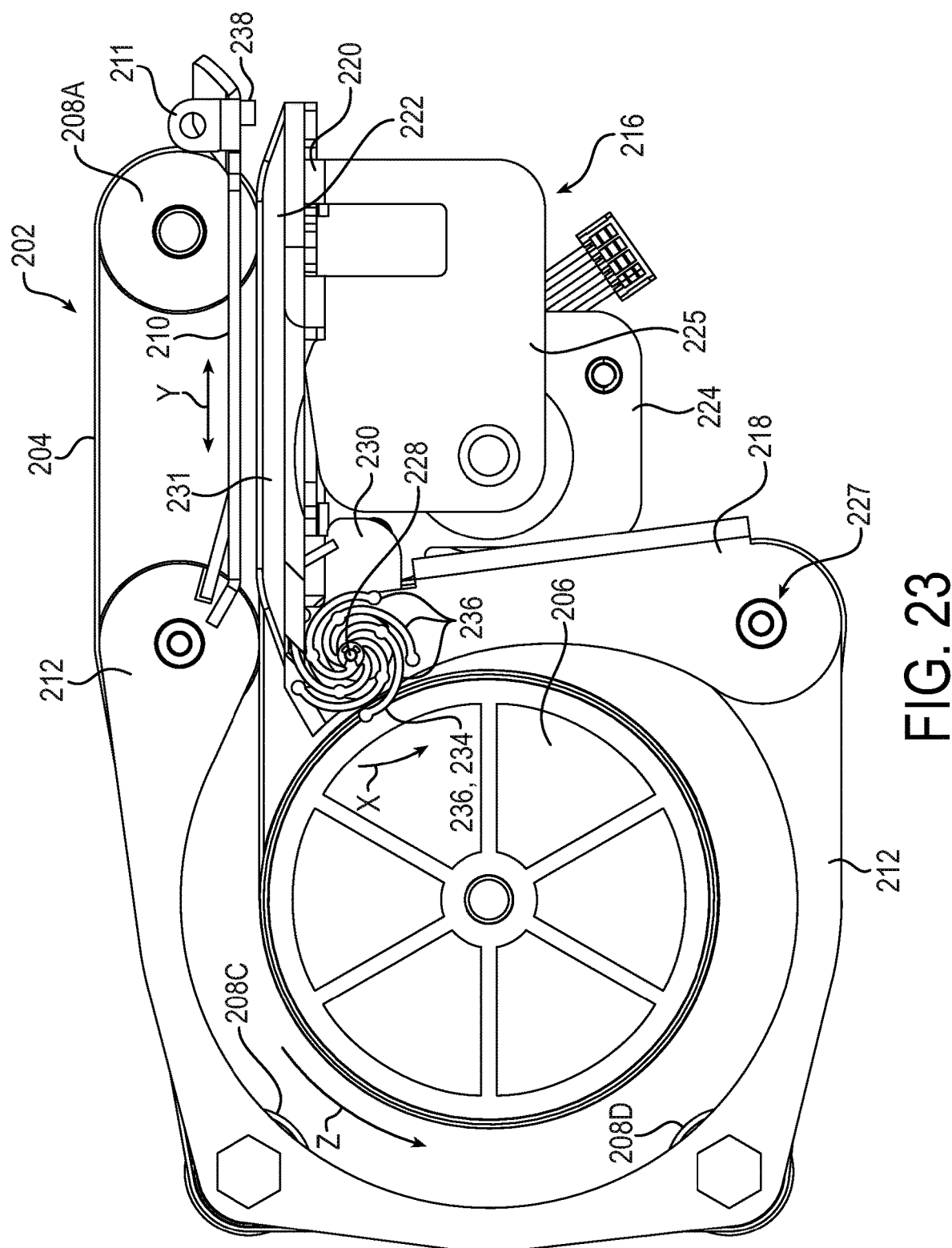
FIG. 23 illustrates an example side view of the embodiment of the escrow subassembly.
Figure 24:
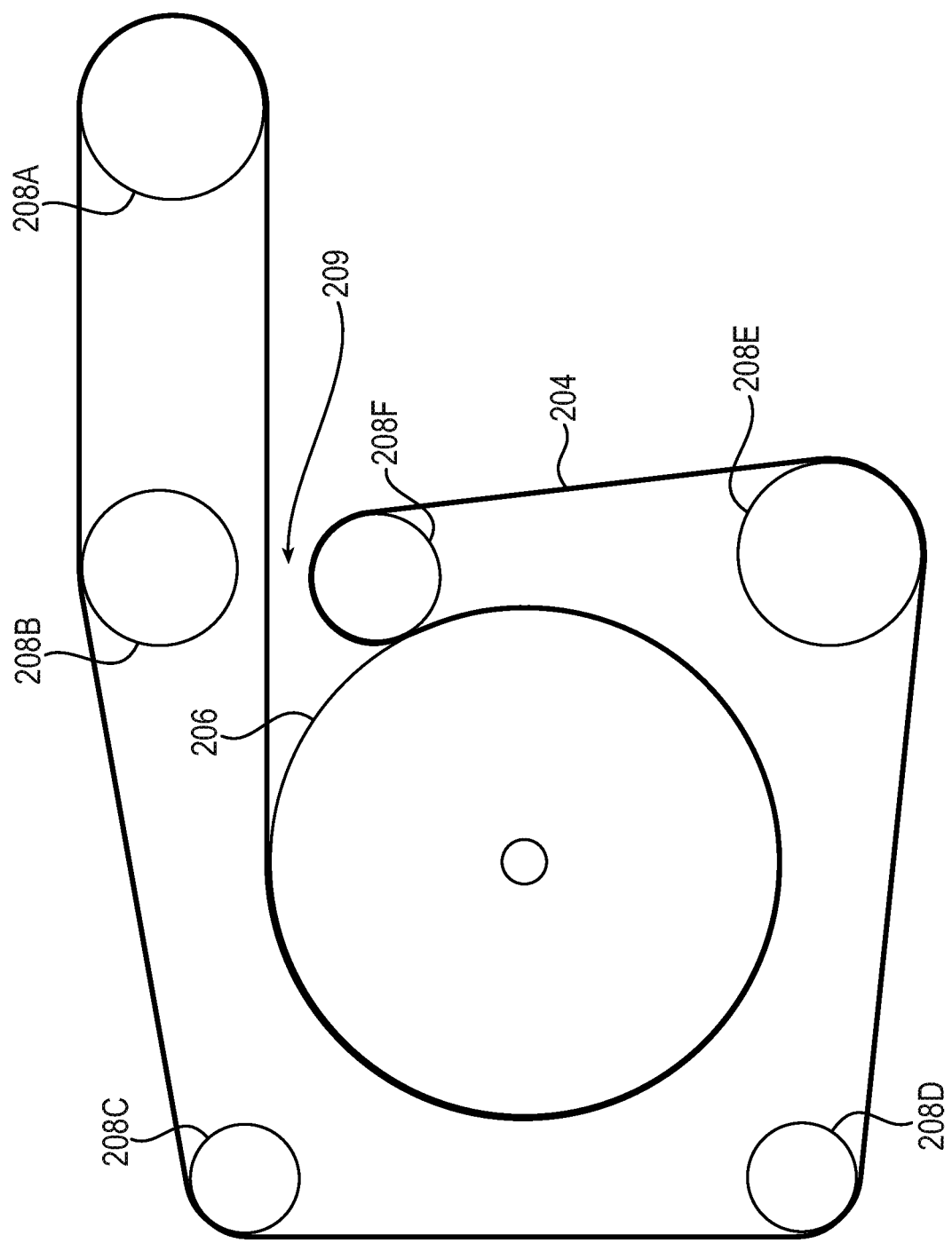
FIG. 24 illustrates an example cross-sectional view a belt of the embodiment of the escrow subassembly.

FIGS. 21-24 illustrate another embodiment of an escrow subassembly 202 that uses a continuous belt 204 at least partially wrapped around an escrow wheel 206 to hold documents instead of using tape as discussed above. In some embodiments, the belt 204 is made of rubber, a polymer or another suitable material. One embodiment of the escrow subassembly 202 has an escrow wheel 206 and six smaller belt wheels 108A-F upon which the continuous belt 204 is wound, as best seen in FIG. 24. The arrangement of the escrow wheel 206 and the belt wheels 208A-F provide for a novel open gap/path 209 through which documents may be rolled onto the escrow wheel 206 as described below.

The escrow subassembly 202 includes components that, in some configurations, are not designed to move including an upper receiving plate 210, two parallel generally C-shaped plates 212 and elongated axels 214A-D. Belt wheels 208A, 208B and 208E are respectively mounted between C-shaped plates 212 on axles 214AC and the escrow wheel 206 is mounted to axel 214D. FIGS. 21-24 illustrated a proof of concept escrow subassembly where axles 214A-C are rigidly attached to rigid housing walls that are not illustrated. However, in other embodiments, axles 214A-C may be shorter and/or attached to a rigid housing or other structure in other ways as understood by those of ordinary skill in the art. The C-shape plates 212 are generally formed out of a metal or another rigid material. In the example illustrated configuration, belt wheels, 208B, 208C, 208D and 208E are mounted between the C-shaped plates 212 with their respective axels are supported by these plates 212. The upper receiving plate 210 is generally planar and formed with a rigid material such as metal or another suitable material. The upper receiving plate 210 may have two or more mounting tabs 211 extending from it for mounting upper receiving plate 210 to a housing.

Figure 21:
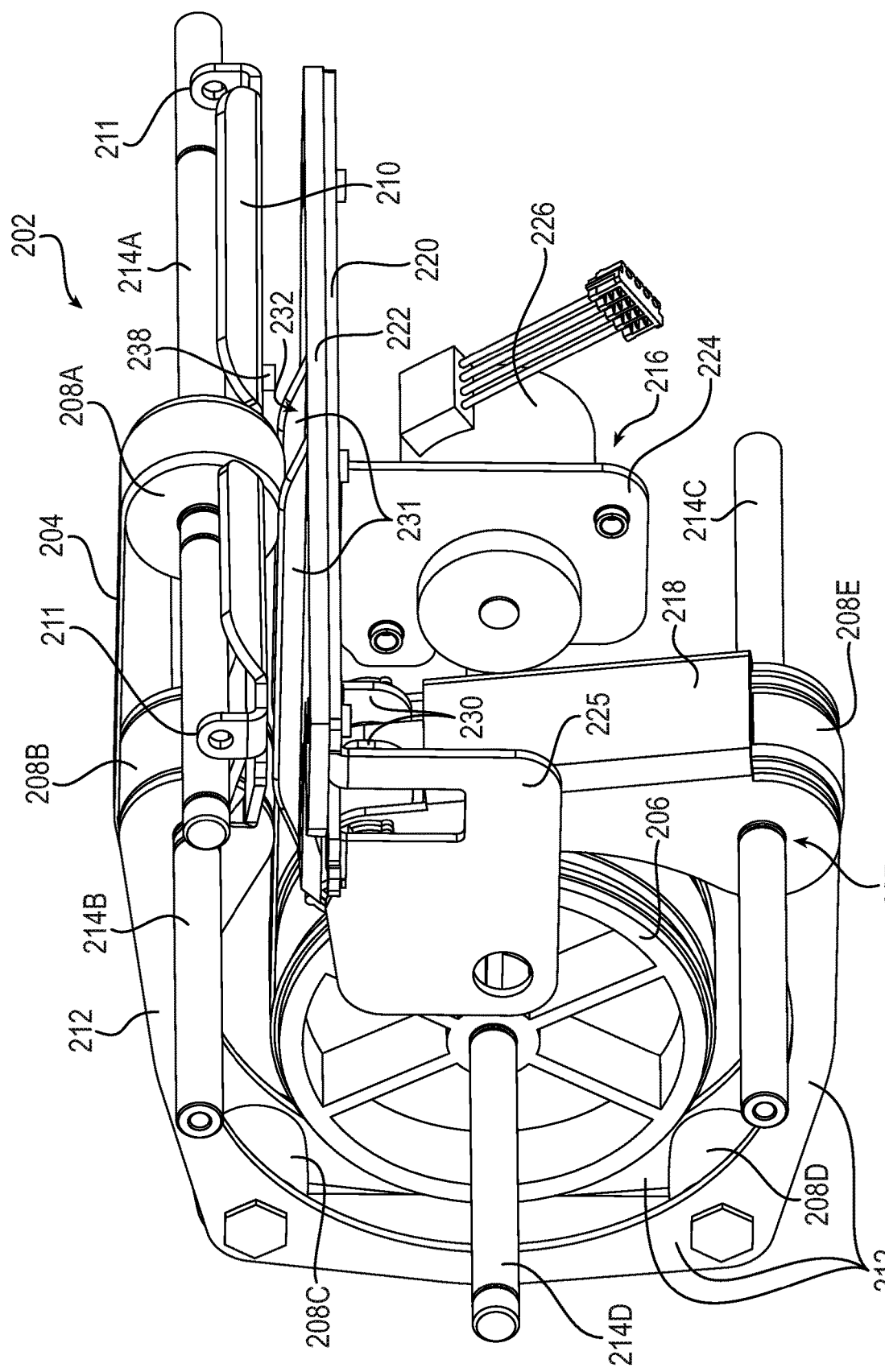
FIG. 21 illustrates an example front-left perspective view of an embodiment of an escrow subassembly.

The escrow subassembly 202 further includes a pivotal front structure 216. The pivotal front structure 216, in some embodiments, includes a swing arm 218, a horizontal support plate 220, a document guide plate 222, a motor support plate 224, a motor 226 and a printer support plate 225. In some embodiments, springs (not illustrated) may be used to bias belt wheel 208F mounted at one end of the swing arm 218 against the escrow wheel 206. As illustrated in FIGS. 21-23, the swing arm 218 may be formed out of a ridged material such as metal and may be U-shaped and formed with two side walls and a front wall between the two side walls. The swing arm 218 is pivotally connected to belt wheel 208E at axis 227 and is pivotally connected to two vertical flanges 230 of horizontal support plate 220 at axis 228. This axis 228 may be the same axis about which belt wheel 208B rotates. The horizontal support plate 220, motor support plate 224 and printer support plate 225 are also formed out of a ridged material such as metal that may be a single sheet of metal that has been bent to form the horizontal support plate 220, motor support plate 224 and printer support plate 225, as illustrated.

A motor (not illustrated) may be attached to motor support plate 224 for rotating a printer (not illustrated) that may print to one or both sides of a document received by the escrow subassembly 202 as discussed below. A printer may be pivotally connected to printer support plate 225 so that motor 226 may rotate a printer ink cartridge to an upward position to print on one side (a first side) of a document before the document reaches the escrow wheel 206 and/or then rotated to horizontal position to print on the other side of the document when the document is at least partially being stored on the escrow wheel 206.

The document guide plate 222 may be formed out of plastic, a polymer or another suitable rigid material and may be attached to the horizontal support plate 220 with screws or in another suitable way. In some embodiments, the horizontal surface of the document guide plate 222 has two spaced apart elongated vertical flanges 231. These flanges 231 are spaced apart and extend upward above the belt 204 as the belt 204 travels between them. As documents are transported into the escrow subassembly 202, these flanges 231 create a depressed area on the documents as the belt wheel 208A pushes the document downward and into the channel formed between the two vertical flanges.

FIG. 24 illustrates a cross sectional view of how the belt is installed on the escrow wheel 206 and the belt wheels 208A-F. As illustrated, a generally square portion of a path of the belt 204 is formed by the belt 204 and belt wheels 208C-F. A generally straight portion is formed by the belt and belt wheels 208A-B. Notice that shape has two "ends" one generally at belt wheel 208A and another at belt wheel 208F. This arrangement allows documents to be collected onto the escrow wheel 206 between the belt 204 and the escrow wheel 206 as documents pass through the open gap 209 that is void of the belt 204.

In some embodiments, the escrow subassembly 202 has paddle wheels 234 (FIG. 23). The paddle wheels 234 have elongated arms 236 that rotate in a counterclockwise direction of arrow X when receiving documents and a clockwise direction opposite to arrow X when removing documents from the escrow wheel 206. In some embodiments, the arms 236 are formed with a flexible material that allows them to be pulled inward toward their central-axis by a centripetal force when rotating in the direction of arrow X when receiving documents so that the paddle wheels 234 do not interfere with documents when receiving documents onto the escrow wheel 206. However, when spinning opposite arrow X in a clockwise direction, the arms 236 are pushed outward by centrifugal force allowing them to contact edge portion of documents pushing them upward onto the document guide plate 222 when removing documents from the escrow wheel 206.

In some configurations and as understood by those of ordinary skill in the art, sensor(s) 283 such as optical sensors or other suitable sensors may be used to track documents being received by the escrow subassembly 202. For example, the sensors 238 may be used to detect front and/or rear edges of documents approaching the escrow subassembly 202 so that the subassembly 202 may operate to maintain an overlap between documents being loaded onto the escrow wheel 206. The overlap of the leading edge of document two with the trailing edge of document one will facilitate the later removal in the reverse order from which they were received. The overlap dimension may be optimized for proper machine function, but may be 10-20 millimeters for example.

Having described the components of the escrow subassembly, its use and operation are now described. In one example configuration and similar to the escrow printer assembly 86 described above, the escrow assembly 202 receives documents one at a time that have been previously aligned and spaced apart from an adjacent drive assembly. For example, a sensor 238 may detect a front edge of a document (first document) is approaching the upper receiving plate 210 and the document guide plate 222. This indicates that a motor or other suitable device will begin driving the escrow wheel 206 in the direction of arrow Z which in turn drives the belt 204. This causes the belt 204 to pull the document across the document guide plate 222 toward the escrow wheel. Eventually the front edge of the document reaches the escrow wheel 206 causing the document to be rolled onto the wheel 206 between the wheel 206 and the belt. In some configurations, the motor and sensors 238 may be monitored and/or controlled by a processor such as the terminal processor 32 or one or more other suitable processors and/or logic. In some configurations, when the sensor 238 detects a back edge of the document the escrow wheel 206 may be driven forward in the reverse direction of arrow Z a predetermined amount to allow for a 10 mm or another desired overlap of documents. When the front edge of another second document is detected by the sensor 238, the escrow wheel 206/belt 204 are again driven to similarly pull the second document onto the document guide plate 222 and onto the escrow wheel 206 while the first document is further rotated onto the escrow wheel 206. Additional documents may be accepted and added to the escrow wheel 206 in a similar way.

As additional documents are stored onto the escrow wheel 206, several layers of documents may begin to accumulate onto the escrow wheel 206. In some configurations, the escrow subassembly 202 may be sized to have about 30 documents stored between the escrow wheel 206 and the belt 204. However, in other configurations, the escrow subassembly 202 may be sized to have any suitable number of documents stored on it. Axes 227, 228 allow documents collected (or removed) on the escrow wheel 206 to push belt wheel 208F as well as the pivotal front structure 216 back and forth in the direction of arrow Y. In some embodiments, side edges of the horizontal support plate 220 may rest in grooves (not illustrated) in walls of a housing that is supporting the escrow assembly 202 to ensure that when the horizontal support plate 220 is moved back and forth in the direction of arrow Y, a generally fixed distance of the document guide plate 222 is maintained with respect to the upper receiving plate 210.

To remove and return documents, the escrow wheel 206 is driven in a clockwise direction as pointed to by the right end of arrow Z. This drives the belt 204 so that the rear edges of documents move generally horizontal off of the escrow wheel 206 toward the document guide plate 222. The paddle wheels 234 are also rotated in a clockwise direction so that their arms 236 swing outward to knock document edges upward where the belt 204 rolls off of the escrow wheel 206 so that document front edges move toward document guide plate 222. At a rear end of the document guide plate 222 the documents are transported by the belt 204 away from the escrow wheel 206 toward the front edge of the document guide plate 222 and out of the escrow subassembly 202 and into a transport that originally transported the documents into the transport subassembly 202.

Example methods may be better appreciated with reference to flow diagrams. For purposes of simplicity, explanation of the illustrated methodologies are shown and described as a series of blocks. It is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 25:
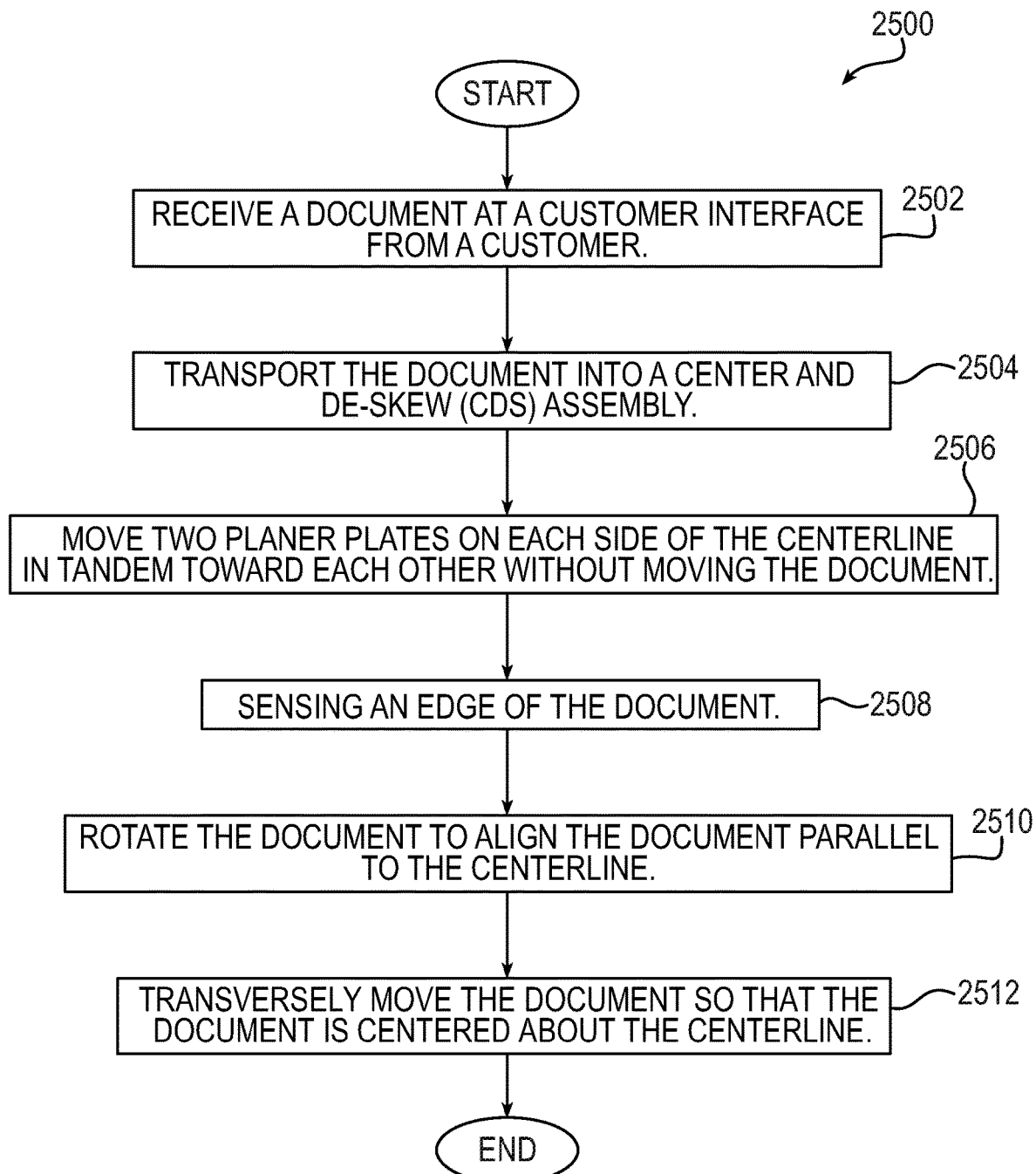
FIG. 25 illustrates an example method of operating a CDS subassembly.

FIG. 25 illustrates a method 2500 of transporting documents in an automated transaction machine (ATM). The method 2500 begins by receiving a document at a customer interface, at 2502, from a customer. The document is then transported into a center and de-skew (CDS) subassembly, at 2504. As mentioned above the CDS subassembly has a centerline of a path the document is to travel. Two planar plates on each side of the centerline are moved in tandem toward each, at 2506, other without moving the document. As the document is moved, sensing an edge of the document with sensors on sides of the two planar plates, at 2508. After sensing the edge, the method 2500, at 2510, rotates the document to align the document parallel the centerline. The document is then transversely moved, at 2512, so that the document is centered about the centerline.

Figure 26:
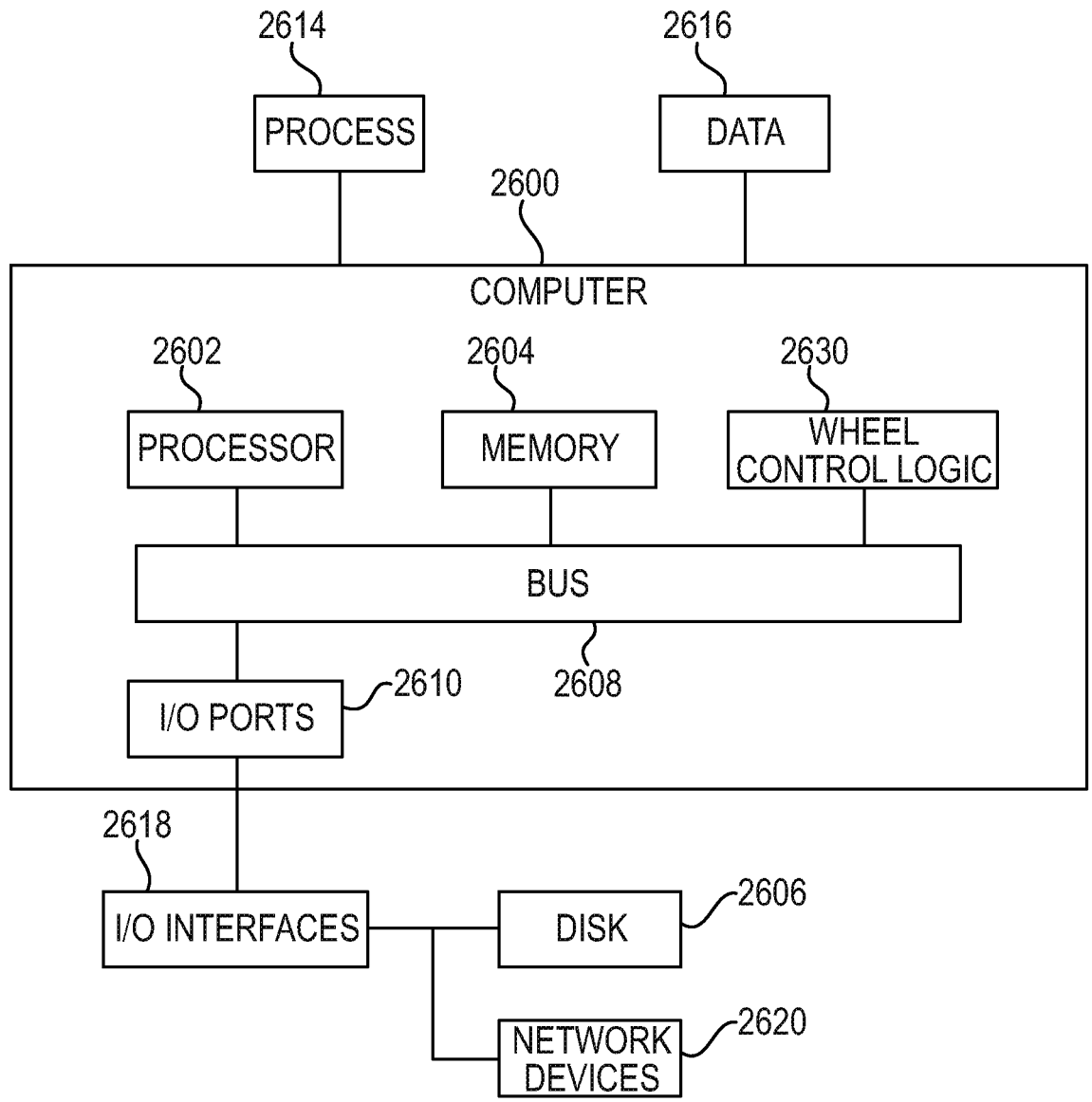
FIG. 26 illustrates a schematic of a computer system which may operate in an ATM.

FIG. 26 illustrates an example computing device in which example systems and methods described herein, and equivalents, may operate. The example computing device may be a computer 2600 that includes a processor 2602, a memory 2604, and input/output ports 2610 operably connected by a bus 2608. In one example, the computer 2600 may include a de-skew control logic 2630 configured to control the de-skew subassembly as described above. In different examples, de-skew control logic 2630 may be implemented in hardware, software, firmware, and/or combinations thereof. Thus, logic 2630 may provide means (e.g., hardware, software, firmware) for controlling the de-skew subassembly. While logic 2630 is illustrated as a hardware component attached to bus the 2608, it is to be appreciated that in one example, logic 2630 could be implemented in processor 2602.

Generally describing an example configuration of computer 2600, processor 2602 may be a variety of various processors including dual microprocessor and other multiprocessor architectures. Memory 2604 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), direct RAM bus RAM (DRRAM) and the like.

A disk 2606 may be operably connected to computer 2600 via, for example, an input/output interface (e.g., card, device) 2618 and an input/output port 2610. Disk 2606 may be, for example, a magnetic disk drive, a solid state disk drive, a floppy disk drive, a tape drive, a Zip drive, a flash memory card, and/or a memory stick. Furthermore, disk 2606 may be a CD-ROM, a CD recordable drive (CD-R drive), a CD rewriteable drive (CD-RW drive), and/or a digital video ROM drive (DVD ROM). Memory 2604 can store a process 2614 and/or a data 2616, for example. Disk 2606 and/or memory 2604 can store an operating system that controls and allocates resources of computer 2600.

Bus 2608 may be a single internal bus interconnect architecture and/or other bus or mesh architectures. While a single bus is illustrated, it is to be appreciated that computer 2600 may communicate with various devices, logics, and peripherals using other busses (e.g., PCIE, SATA, Infiniband, 1384, USB, Ethernet). Bus 2608 can be types including, for example, a memory bus, a memory controller, a peripheral bus, an external bus, a crossbar switch, and/or a local bus.

Computer 2600 may interact with input/output devices via input/output interfaces 2618 and input/output ports 2610. Input/output devices may be, for example, a keyboard, a microphone, a pointing and selection device, cameras, video cards, displays, the disk 2606, the network devices 2620, and so on. The input/output ports 2610 may include, for example, serial ports, parallel ports, USB ports and the like.

The computer 2600 can operate in a network environment and thus may be connected to network devices 2620 via input/output interfaces 2618, and/or the input/output ports 2610. Through network devices 2620, computer 2600 may interact with a network. Through the network, computer 2600 may be logically connected to remote computers. Networks with which computer 2600 may interact include, but are not limited to, a local area network (LAN), a wide area network (WAN), and other networks. The networks may be wired and/or wireless networks.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element, or limitation.

What is claimed is:

1. A center de-skew (CDS) subassembly to align a document about a center of a path to be traveled by the document comprising:
   a lower-central plate with a planar surface having a centerline;
   a transport mechanism configured to transport the document so that the document is adjacent the lower-central plate;
   a pair of generally planar plates operable to move in tandem toward and away from the centerline;
   a plurality of edge-detection sensors on the pair of generally plainer plates configured to sense an edge of the document as the plates move toward the centerline;
   a translate/rotate mechanism configured to translate and rotate the document until one of the edge-detection sensors detect an edge of the document; and
   a control logic configured to control the plates to move in tandem toward and from the centerline moving the plurality of edge-detection sensors until at least one of the edge-detection sensors detects an edge of the document, wherein the control logic is configured to operate the translate/rotate mechanism to rotate the document while controlling the plates to move in tandem toward the centerline so that the translate/rotate mechanism aligns the document parallel to the centerline as a parallel-aligned document, and wherein the control logic is configured to control translate/rotate mechanism to center the parallel-aligned document about the centerline to create a centered document.

2. The CDS subassembly of claim 1 wherein the generally planar plates further comprise:
   a plurality of elongated openings extending from outside edges of the plates inward toward the centerline of the lower-central plate, wherein the plurality of edge-detection sensors sense the document through the plurality of elongated openings.

3. The CDS subassembly of claim 1 wherein the plurality of generally planar plates further comprise:
   a right plate;
   a left plate, wherein the plurality of edge detectors further comprise:
   a front left edge-detection sensor on the left plate;
   a front right edge-detection sensor on the right plate;
   a rear left edge-detection sensor on the left plate; and
   a rear right edge-detection sensor on the right plate.

4. The CDS subassembly of claim 1 wherein the control logic is configured to determine an edge of the document is detected when between 40 percent and 60 percent of one of the edge-detection sensors is covered by an edge of the document.

5. The CDS subassembly of claim 1 wherein the translate/rotate mechanism further comprises:
a rear wheel configured to contact the document; and
a front wheel configured to contact the document, wherein the rear wheel and the front wheel are configured to rotate in opposite directions to rotate the document relative to the lower-central plate, and wherein the rear wheel and the front wheel are configured to rotate in a same direction to translate the document relative to the lower-central plate.

6. The CDS subassembly of claim 5 wherein the rear wheel and the front wheel rotate about the centerline.

7. The CDS subassembly of claim 6 wherein the front wheel is centered about the centerline and rotates perpendicular to the centerline, and wherein the rear wheel is centered about the centerline and rotates perpendicular to the centerline.

8. The CDS subassembly of claim 5 further comprising:
a first stepper motor configured to rotate the front wheel; and
a second stepper motor configured to rotate the rear wheel.

9. The CDS subassembly of claim 1 wherein the pair of generally planar plates further comprise:
a right plate with a first magnetic ink character recognition (MICR) reader device; and
a left plate with a second MICR reader device.

10. The CDS subassembly of claim 9 wherein the centered document is aligned to have magnetic indicia on the centered document read by the first MICR reader device or the second MICR reader device without requiring any additional MICR reader device or alignment of the centered document.

11. The CDS subassembly of claim 1 further comprising:
one or more movement mechanisms, and wherein the translate/rotate mechanism further comprises:
a rear wheel configured to contact the document; and
a front wheel configured to contact the document
wherein the control logic is configured to move the transport mechanism into and out of contact with the document, wherein the control logic is configured to move the rear wheel and the front wheel into and out of contact with the document.

12. The CDS subassembly of claim 11 further comprising:
a lower CDS subassembly beneath and adjacent the lower-central plate;
wherein the one or more movement mechanisms is configured to move the transport mechanism up and down to contact the document between the lower CDS subassembly and the lower-central plate, wherein the one or more movement mechanisms is configured to move the rear wheel and the front wheel up and down to contact the document.

13. The CDS subassembly of claim 11 wherein the one or more movement mechanisms further comprises:
an electric motor; and
a mechanical cam, wherein the electric motor and mechanical cam are configured to move the transport mechanism into and out of contact with the document.

14. The CDS subassembly of claim 1 wherein the transport mechanism further comprises:
a plurality of wheels configured to contact the document to transport the document adjacent the lower-central plate.

15. The CDS subassembly of claim 14 wherein the plurality of wheels are aligned with the centerline.

16. A center-alignment apparatus for use in an ATM comprises:
a transport mechanism configured to transport a document into the apparatus;
at least one plate operable to move the document toward a centerline of a path the document is to travel;
at least one edge-detection sensor configured to sense an edge of the document;
a translate/rotate mechanism configured to translate and rotate the document until the at least one edge-detection sensor detects an edge of the document; and
a control logic configured to control the at least one plate to move toward the centerline until the at least one edge-detection sensor detects an edge of the document, wherein the control logic is configured to operate the translate/rotate mechanism to rotate the document to align the document parallel to the centerline as a parallel-aligned document, and wherein the control logic is configured to control the translate/rotate mechanism to transversely move the parallel-aligned document to center the parallel-aligned document about the centerline to create a centered document.

17. The center-alignment apparatus of claim 16 wherein the control logic is configured to operate the translate/rotate mechanism to rotate the document while controlling the at least one plate to move in tandem toward the centerline to align the document parallel to the centerline.

18. The center-alignment apparatus of claim 16 wherein the at least one plate further comprises:
a left plate;
a right plate, wherein the at least one sensor further comprises:
two sensors on the left plate; and
two sensors on the right plate.

19. The center-alignment apparatus of claim 16 wherein while operating the translate/rotate mechanism to rotate the document to align the document parallel to the centerline the control logic is configured to control the plates to move in tandem toward the centerline.

* * * * *